(12) United States Patent
Anderson et al.

(10) Patent No.: US 9,802,524 B2
(45) Date of Patent: Oct. 31, 2017

(54) SYSTEM AND METHOD OF OPERATING A POSITIONING MODE ACTUATOR TO OPERATE A MATERIAL DISPERSAL DEVICE

(71) Applicant: Caterpillar Inc., Peoria, IL (US)

(72) Inventors: Ryan Anderson, Germantown Hills, IL (US); Kurt Winckler, Washington, IL (US); Rodney Menold, Peoria, IL (US); Joel Skalet, Chillicothe, IL (US); Timothy Schwartz, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 63 days.

(21) Appl. No.: 15/057,600

(22) Filed: Mar. 1, 2016

(65) Prior Publication Data

US 2017/0253163 A1  Sep. 7, 2017

(51) Int. Cl.
| | |
|---|---|
| *B60W 10/18* | (2012.01) |
| *B60P 1/16* | (2006.01) |
| *B60P 1/28* | (2006.01) |
| *B62D 33/02* | (2006.01) |
| *B60P 1/04* | (2006.01) |
| *B60W 10/06* | (2006.01) |

(52) U.S. Cl.
CPC ............... *B60P 1/286* (2013.01); *B60P 1/045* (2013.01); *B60P 1/16* (2013.01); *B62D 33/02* (2013.01); *B60P 1/162* (2013.01); *B60W 10/06* (2013.01); *B60W 10/18* (2013.01); *B60W 2510/0642* (2013.01); *B60W 2510/101* (2013.01)

(58) Field of Classification Search
CPC . B60P 1/045; B60P 1/16; B60P 1/162; B60W 2510/0642; B60W 30/18054
USPC ...................................................... 701/48, 50
See application file for complete search history.

(56) References Cited

U.S. PATENT DOCUMENTS

| | | | |
|---|---|---|---|
| 3,966,254 A | 6/1976 | Guhl et al. | |
| 4,003,601 A | 1/1977 | Gerding | |
| 4,508,388 A | 4/1985 | Minami | |
| 5,452,942 A * | 9/1995 | Brooks ................... | B60P 1/162 180/271 |
| 8,731,787 B2 | 5/2014 | Tamura et al. | |
| 8,979,208 B2 * | 3/2015 | Roach .................... | B60K 20/08 298/22 C |
| 9,086,130 B1 | 7/2015 | Anderson et al. | |
| (Continued) | | | |

FOREIGN PATENT DOCUMENTS

EP             2949506           12/2015

*Primary Examiner* — Thomas G Black
*Assistant Examiner* — Wae Louie

(57) ABSTRACT

A method for implementing an operation of a body of a machine includes receiving data indicating an operation of a positioning mode actuator to facilitate movement of the body from a first position, determining activation state of a multi-auto mode to actuate a first auto lower mode to operate a hoist system to lower the body automatically and a first auto raise mode to operate the hoist system to raise the body automatically. The method includes determining the first auto lower mode is selected according to the data indicating the operation of the positioning mode actuator, and causing a hoist system to actively lower the body from the first position to a second position and passively lower the body from the second position to a third position, independent of the activation state of the multi-auto mode.

20 Claims, 12 Drawing Sheets

(56) References Cited

U.S. PATENT DOCUMENTS

| | | | |
|---|---|---|---|
| 2002/0047300 A1* | 4/2002 | Uematsu | B60P 1/162 298/22 R |
| 2010/0026079 A1 | 2/2010 | Nabeshima et al. | |
| 2014/0222303 A1* | 8/2014 | Chary | B60P 1/283 701/50 |
| 2017/0072825 A1* | 3/2017 | Anderson | B60P 1/16 |

* cited by examiner

SYSTEM AND METHOD OF OPERATING A POSITIONING MODE ACTUATOR TO OPERATE A MATERIAL DISPERSAL DEVICE

TECHNICAL FIELD

The present disclosure relates generally to an actuator for controlling movement of a material dispersal device of a machine, and a system for dynamically configuring the actuator to operate different types of material dispersal devices.

BACKGROUND

Load carrying machines, including trucks, wheel loaders and the like, are commonly employed during construction and excavation for transporting loads from one point to another. These load carrying machines may comprise a body for holding and transporting material, often known as a dump body, which can be raised relative to a chassis of a machine and tipped about a pivot point to empty any material held therein as a means for dispersing the material. The body may be controlled to move between a fully raised position and a fully lowered position resting upon the chassis. In addition, the one or more actuators used to raise and lower the body may be operated to implement a float operation in which the body is lowered under its own weight from a position proximate to the fully lowered position.

U.S. Pat. No. 8,731,787 ("the '787 patent"), entitled "Transporter Vehicle," is directed toward a dump truck that includes a vessel mounted on a vehicle body to tilt about a pin functioning as a fulcrum. The dump truck described in the '787 patent includes a hoist cylinder that expands and contracts according to a supply of pressurized fluid to tilt the vessel, and a control valve device that controls the supply of pressurized fluid to and from the hoist cylinder. As described in '787 patent, an operating device for switching operations of the control valve device includes an operating lever that may be manually tilted between separate and distinct retaining, raising, floating, and lowering positions corresponding to respective switching positions of the control valve device.

Alternatively, a load carrying machine may comprise an ejector positioned in a body that holds material. The ejector may be controlled by one or more actuators to move to a fully ejected position at a rear of the body, in order to eject/disperse material from the body. The ejector may be subsequently controlled to move to a fully retracted position in which the ejector is returned to a front of the body.

A body that is raised and lowered to disperse material from a load carrying machine may have 4 operations (Lower, Float, Hold, Raise). An ejector that moves within a body to disperse material from a load carrying machine may have 3 operations (Retract, Hold, Eject), which may be selectable by an operator in a similar manner as 3 operations (Lower, Hold, and Raise) of the body. However, control instruments usable by an operator to control a position of the body may be different from control instruments for the ejector, on account of a need for a separate selectable lever position or button corresponding to the float operation of the body. Thus, there is a need for improved common control instruments that may be installed in different load carrying machines incorporating different devices for dispersing material. In addition, there is a need for an improved system for configuring the common control instruments to adapt and be utilized to fully operate the different types of devices for dispersing material.

SUMMARY

According to an aspect of the present disclosure a method for implementing an operation of a body of a machine includes receiving, using one or more processors, data indicating an operation of a positioning mode actuator to facilitate movement of the body from a first position. The method further includes determining, using the one or more processors, an activation state of a multi-auto mode to actuate a first auto lower mode to operate a hoist system to lower the body automatically and a first auto raise mode to operate the hoist system to raise the body automatically, in response to receiving the data indicating the operation of the positioning mode actuator. According to another aspect of the present disclosure, the method includes determining, using the one or more processors, the first auto lower mode is selected according to the data indicating the operation of the positioning mode actuator and causing a hoist system to actively lower the body from the first position to a second position and passively lower the body from the second position to a third position, in response to determining the first auto lower mode is selected, independent of the activation state of the multi-auto mode.

According to an aspect of the present disclosure a method for implementing an operation of a body of a machine includes receiving, using one or more processors, first data indicating a lever pivotally mounted on an actuator base of a positioning mode actuator is disengaged from a center detent within the actuator base. The method further includes determining, using the one or more processors, an operating direction of the lever relative to the center detent according to the first data and a moving direction for moving the body according to the operating direction of the lever, causing a hoist system to actively move the body in the moving direction, and detecting, using one or more sensors, a position of the body as the body moves in the moving direction. The method further includes causing the hoist system to stop actively moving the body in the moving direction at a second position and passively move the body in the moving direction from the second position to a third position, in response to determining the moving direction corresponds to a lowering motion of the body, the lever remains disengaged from the center detent and the operating direction of the lever continues to correspond to the lowering motion, and the body is located at the second position.

According to an aspect of the present disclosure, a machine includes a frame, a cab mounted on the frame and configured to accommodate a user, an engine mounted on the frame, and a body attached to the frame configured to hold material. The machine further includes a material dispersal device configured to move relative to the frame to move the material from the body, a positioning mode actuator in the cab configured to actuate a dispersal device actuator to move the material dispersal device, a sensor configured to detect a position of the material dispersal device, and a controller operatively connected to the positioning mode actuator, the dispersal device actuator, the sensor, and the engine. According to an aspect of the present disclosure, the material dispersal device is one of the body and the an ejector positioned in the body. According to another aspect of the present disclosure, the controller is configured to access the sensor and determine the material dispersal device is one of the body and the ejector according to position data obtained from the sensor, and set a control mode for operating the dispersal actuator according to the material dispersal device being the one of the body and the ejector.

DETAILED DESCRIPTION

Aspects of the disclosure will now be described in detail with reference to the drawings, wherein like reference numbers refer to like elements throughout, unless specified otherwise.

It is noted that as used in the specification and the appending claims the singular forms "a," "an," and "the" can include plural references unless the context clearly dictates otherwise.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein, or otherwise clearly contradicted by context.

Figure 1:
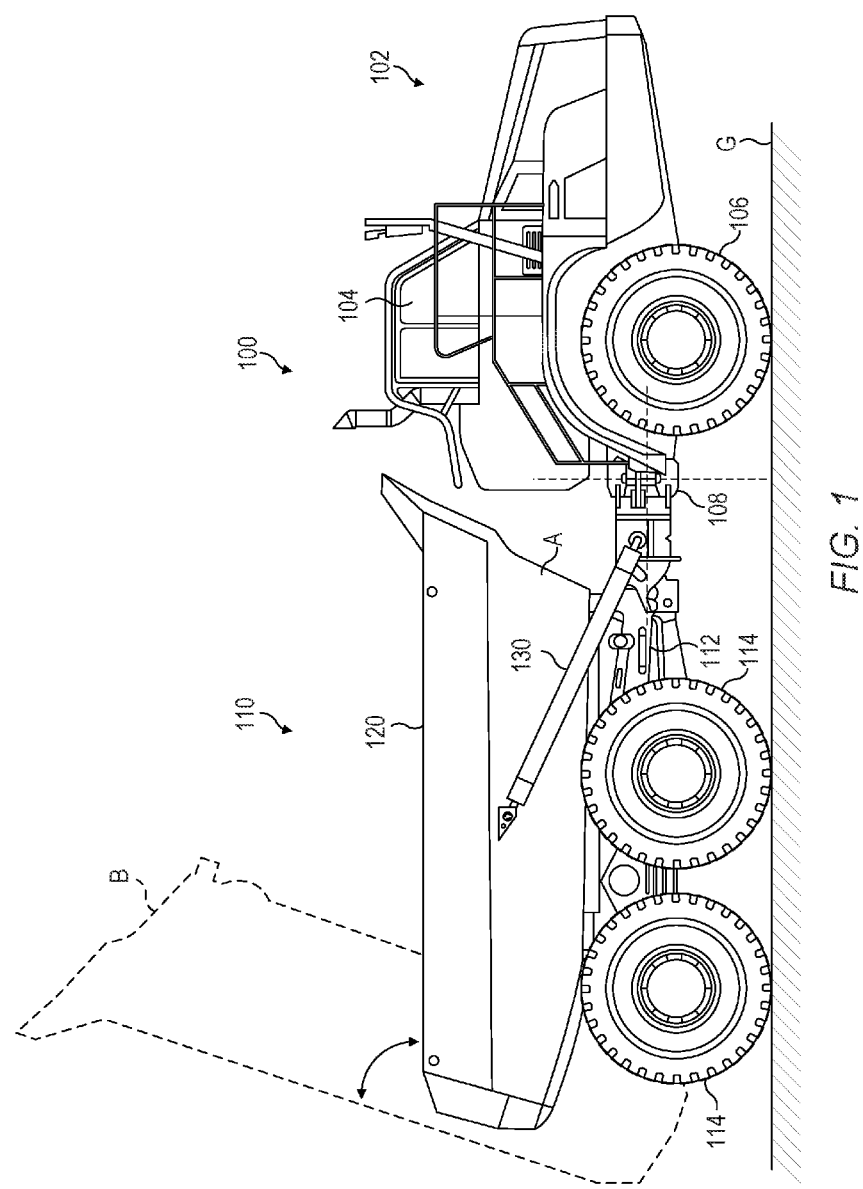
FIG. 1 illustrates a side view of a machine, according to an aspect of the present disclosure.

FIG. 1 illustrates a side view of a machine 100, according to an aspect of the present disclosure. The machine 100 illustrated in FIG. 1 is an exemplary machine, and aspects of the present disclosure may be implemented in various types of machines including but not limited to articulated trucks with tipping bodies, articulated trucks with ejector mechanisms, articulated wheel loaders, and the like.

The machine 100 may include a first frame 102, for example a tractor unit, attached to a second frame 110, for example a trailer unit. The first frame 102 may include a cab 104 that may accommodate an operator and house a plurality of controls for operating the machine 100. The first frame 102 may be supported by a pair of first wheels 106, and attached by a coupling 108 to a chassis 112 of the second frame 110. The coupling 108 may be an articulation joint, and may allow each of the first frame 102 and the second frame 110 to be orientated at a different yaw and/or roll angle relative to the other frame. The chassis 112 may be supported by pairs of second wheels 114 that may, along with the first wheels 106, be in contact with a ground level G, or any other surface on which the machine 100 is operated.

The second frame 110 may comprise a body 120, such as a dump body, pivotally attached to the chassis 112 of the second frame 110 at a pivot point. The second frame 110 may further comprise a hoist device 130 which, when actuated, may raise the body 120 from a first body position A (e.g. a fully lowered position or a maximum position in a lowering direction) resting on the chassis 112, and cause the body 120 to rotate about the pivot point into a second body position B (e.g. a fully raised position or a maximum position in a raising direction) at an angle relative to the chassis 112. As the body 120 rotates into the second body position B, the body 120 may dump and disperse some or all materials or a load from within the body 120. As such, the body 120 defines a material dispersal device of the machine 100. The hoist device 130 may be actuated to carry out a reverse operation in which the body 120 is lowered from the second body position B back to the first body position A.

The hoist device 130 may be connected between the body 120 and the chassis 112, and the machine 100 may include at least one hoist device 130 on each side of the body 120 relative to a longitudinal axis of the machine 100. Alternatively, at least one or more of the hoist device 130 may be provided underneath the body 120 or in another configuration. The hoist device 130 may be any device, hydraulic, electrical, mechanical, or combination thereof, suitable for raising and lowering the body 120. In addition, the machine 100 may include another type of material dispersal device which ejects materials or a load from the body 120. Such an ejector device may include an ejector plate (not shown) that slides along the longitudinal direction of the machine 100.

Figure 2:
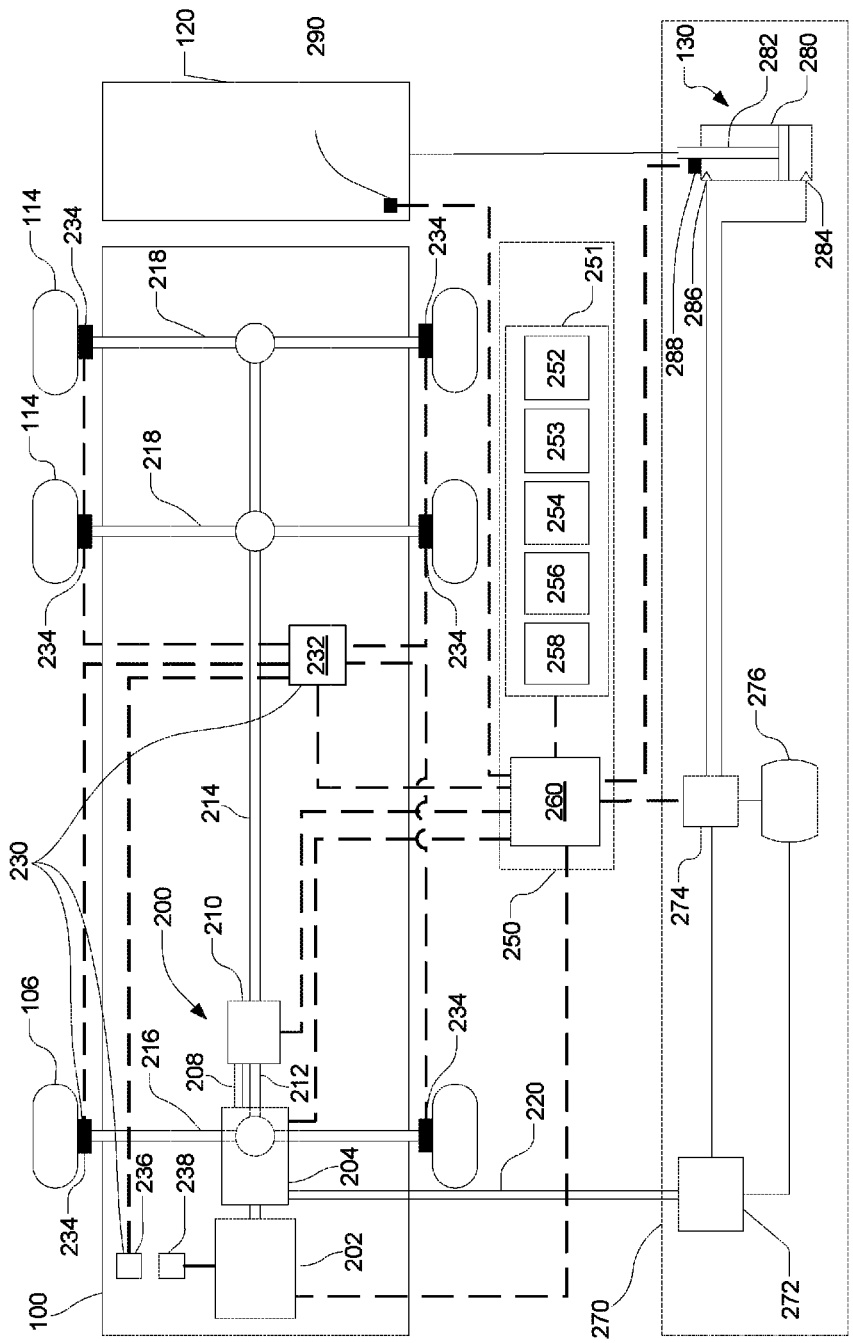
FIG. 2 is a schematic top view of the machine of FIG. 1, according to an aspect of the present disclosure.

FIG. 2 is a schematic top view of the machine 100 of FIG. 1, according to an aspect of the present disclosure. FIG. 2 includes schematic top view of a drive train 200, a brake system 230, a control system 250, and a hoist system 270. As illustrated in FIG. 2, the drive train 200 includes an engine 202 coupled to a transmission 204; the brake system 230 includes a brake controller 232, brake devices 234, and a manual brake actuator 236; the control system 250 includes an actuator system 251 and a main controller 260; and the hoist system 270 includes the hoist device(s) 130.

As illustrated in FIG. 2, the transmission 204 is coupled to a torque transmitting arrangement 210 by a first transmission shaft 208. The engine 202 and the transmission 204 may be mounted on the first frame 102. The torque transmitting arrangement 210 includes the first transmission shaft 208, a first drive shaft 212, and a second drive shaft 214. The torque transmitting arrangement 210 may transfer an output of the engine 202, such as a torque output, to the first drive shaft 212 and the second drive shaft 214. The first drive shaft 212 may be connected to a first axle 216 by a mechanism, such as a differential, and may transmit torque corresponding to the output of the engine 202 to the first wheels 106 attached to the first axle 216. The second drive shaft 214 may be connected to second axles 218 by respective mechanisms, such as differentials, and may transmit torque corresponding to the output of the engine 202 to the pairs of second wheels 114 attached to the second axles 218.

The output of the engine 202 may be transmitted to the first wheels 106 and the second wheels 114 according to a range of an operative engagement between a gear train of the transmission 204 and the first transmission shaft 208. In a neutral transmission range of the transmission 204, the gear train, or a component of the gear train, may be disconnected from the first transmission shaft 208, for example by a clutch, in such a manner that the output of the engine 202 is not transmitted to the first transmission shaft 208. Other transmission ranges may include one or more drive modes in which the output of the engine 202 is transmitted to the first wheels 106 and/or second wheels 114, such as a forward drive mode which allows a gear ratio of the gear train to change automatically, and a reverse drive mode. An appropriate transmission range for the operating of the machine 100 may be obtained based on various inputs.

As illustrated in FIG. 2, the brake system 230 includes the brake controller 232 and the brake devices 234 positioned on each of the first wheels 106 and the second wheels 114. In the actuated state, the brake devices 234 apply respective brake forces to the first wheels 106 and the second wheels 114, and as a result, the first wheels 106 and the second wheels 114 are prevented from rotating. The brake devices 234 may be actuated based on several operator inputs. According to an aspect of the present disclosure, a manual brake actuator 236 of the brake system 230 may include, for example, a foot pedal, and an operator may apply a continuous force to the manual brake actuator 236 in order to directly actuate the brake devices 234. The manual brake actuator 236 may be in operative communication with, and operated by control signals from, the brake controller 232, or in the alternative, the main controller 260, which may operate the brake controller 232 to actuate the brake devices 234 according to an input to the manual brake actuator 236.

Another direct actuation of the brake devices 234 may occur in response to an operation of an automatic brake actuator 258 of the actuator system 251. Under certain conditions, for example when the machine 100 is parked or the transmission 204 is in the neutral transmission range and the machine 100 is stationary, an operator may perform a one-time operation of the automatic brake actuator 258. The main controller 260 receives a signal indicating the automatic brake actuator 258 has been operated, and controls the brake controller 232 to actuate, and maintain in the actuated state, the brake devices 234. Thus, an operator may end operation of the manual brake actuator 236 with the brake devices 234 being automatically maintained in the actuated state. According to another aspect of the present disclosure, the main controller 260 may operate to hold the transmission 204 in a current transmission range (i.e. maintain the transmission 204 in gear) in response to the automatic brake actuator 258 being operated when a current transmission range is a drive or reverse transmission range.

The control system 250 includes the actuator system 251 and the main controller 260. The actuator system 251 may include a first actuator 252 (hereafter referred to as "transmission range actuator 252"), a second actuator 253 (hereafter referred to as "multi-auto mode enablement actuator 253"), a third actuator 254 (hereafter referred to as "multi-system mode actuator 254"), a fourth actuator 256 (hereafter referred to as "positioning mode actuator 256"), and the automatic brake actuator 258. The actuator system 251 may be connected to and communicate with the main controller 260. It will be appreciated that each of the transmission range actuator 252, the multi-auto mode enablement actuator 253, the multi-system mode actuator 254, and the positioning mode actuator 256 may be connected to the main controller 260 independently or through a central communication device, such as bus or network connection.

As described in more detail below with reference to FIGS. 4-9, the transmission range actuator 252 may be operatively connected to the transmission 204 and configured to change the transmission range. The multi-auto mode enablement actuator 253 may be operatively connected to the hoist system 270, the multi-system mode actuator 254, and the positioning mode actuator 256; and configured to enable selection of different operating modes of the hoist system 270 for moving the body 120 automatically. The multi-system mode actuator 254 may be operatively connected to the engine 202, the transmission 204, the brake system 230, the hoist system 270, the multi-auto mode enablement actuator 253, and the positioning mode actuator 256; and configured to actuate operations of the engine 202, the transmission 204, and the brake system 230 in combination with operations of the hoist system 270. The positioning mode actuator 256 may be operatively connected to the hoist system 270, the multi-auto mode enablement actuator 253, and the multi-system mode actuator 254; and configured to actuate the hoist system 270 operate the hoist device 130 to move the body 120 automatically or in response to manual operation of the positioning mode actuator 256.

The hoist system 270 may be a hydraulic system, including at least one hydraulic actuator. Alternatively, the hoist system 270 may be a pneumatic or electrical system, comprising pneumatic or electrical actuators. According to an aspect of the present disclosure, the hoist system 270 may include a pump 272 that is connected to the transmission 204 by a second transmission shaft 220. A valve 274 may be a control valve, and may be operated in conjunction with operations of the multi-auto mode enablement actuator 253, the multi-system mode actuator 254, and the positioning mode actuator 256 to control a supply of pressurized fluid to/from the hoist device 130. The hoist device 130 may include actuator cylinders 280 that provide a fixed length of straight-line motion. The actuator cylinders 280 may be attached to each side of the body 120. According to an aspect of the present disclosure, each actuator cylinder 280 may house a driven member 282, such as a tight-fitting piston movable within a closed cylinder and attached to a rod that extends from one end of the closed cylinder to provide mechanical output. The driven member 282 may be arranged to apply a directional force to the body 120 during an actuation of the hoist device 130.

Each actuator cylinder 280 may include a first fluid port 284 and a second fluid port 286 for supplying or outputting a working fluid according to a desired direction of movement of the driven member 282, and thus, according to a desired direction of movement of the body 120. The valve 274 may connect the first fluid port 284 and the second fluid port 286 of each actuator cylinder 280 of the hoist device 130 to a working fluid supply, such as the pump 272, or a fluid return, such as the fluid tank 276, according to an actuation and selected direction of a movement of the body 120. The pump 272 may be driven by the engine 202, using the second transmission shaft 220 and the transmission 204, to supply pressurized working fluid to the actuator cylinders 280 of the hoist device 130. As such, the hoist system 270 provides a dispersal device actuator that actuates the material dispersal device provided by the body 120.

According to one aspect of the present disclosure, the valve 274 may be a solenoid valve or the like, and move between multiple positions according to a supply current or other means of applying a force thereto. The valve 274 may have a first valve position in which the pump 272 is in fluid communication with the first fluid port 284 and the fluid tank 276 is in fluid communication with the second fluid port 286 of each actuator cylinder 280. The driven member 282 may be driven by the supply of working fluid to the first fluid port 284 to extend out of the actuator cylinder 280 and raise the body 120. The valve 274 may have a second valve position in which the pump 272 is in fluid communication with the second fluid port 286 and the fluid tank 276 is in fluid communication with the first fluid port 284 of each actuator cylinder 280. The driven member 282 may be driven by the supply of working fluid to the second fluid port 286 to retract into the actuator cylinder 280 and lower the body 120 (e.g. a "power down operation"). Alternatively, it will be appreciated that the hoist device 130 may include additional components, or engage and actuate components of the body 120, such that the extension and retraction of the driven member 282 actuate the lowering and raising movements of the body 120, respectively.

In a third valve position, the actuator cylinders 280 remain pressurized, while any flow of the working fluid is prevented from being conveyed into or out of the first fluid port 284 and the second fluid port 286. Accordingly, when the valve 274 is in the third valve position, the body 120 may be held in a position between the first position A and the second position B. Alternatively, in a fourth valve position, the hoist device 130 is unpressurised or under a low pressure, with the first fluid port 284 and the second fluid port 286 of each actuator cylinder 280 connected to atmospheric pressure or to a source of low pressure such as the fluid tank 276. As a result, no force will be applied to the driven member 282 to oppose a force applied due to the weight of the body 120. Thus, in the fourth valve position, the hoist system 270 passively moves body 120 according to a float operation by allowing the body 120 to move under its own weight ("float") to the first position A.

According to an aspect of the present disclosure, a degree by which the valve 274 is positioned in any of the first, second, third, or fourth valve positions may be varied in order modulate a respective operational result of the hoist system 270 for that valve position. For example, the valve 274 may be operated to be progressively positioned from a full second valve position to a less than full second valve position in order to meter fluid communication (e.g. control a flow rate) between the pump 272 and the second fluid port 286, and between the fluid tank 276 and the first fluid port 284. As a result, the motion (speed and power) of the driven member 282 progressing into the actuator cylinder 280 is controlled and a speed the body 120 is moves towards the first position A may be modulated or kept constant.

The position of the driven member 282, or other components that move with a movement of the body 120, may be detected and communicated to the main controller 260 by a position sensor 288. The position sensor 288 monitors the position of the body, and may monitor the direction of motion of the body 120, according to one aspect of the present disclosure. In addition, the body 120 may include a weight sensor 290 or payload estimator that communicates with the main controller 260. As discussed in more detail below, weight data from the weight sensor 290, and movement speed data derived from the position data from the position sensor 288 over time, maybe used to control a speed and positional profile of the movement of the body 120 in response to operations of at least the positioning mode actuator 256.

Figure 3:
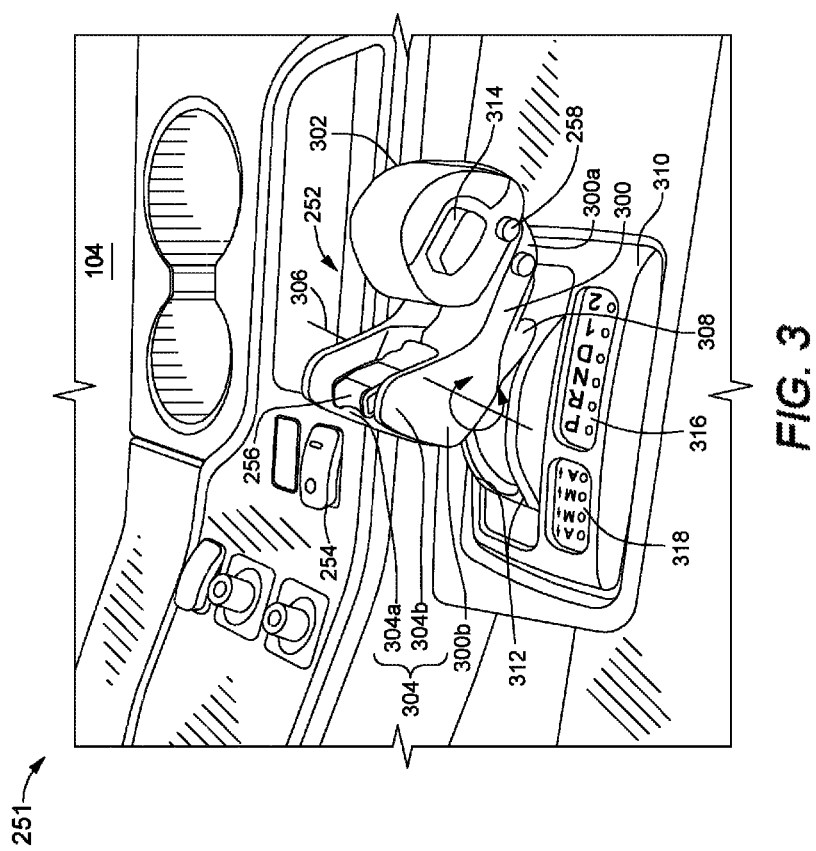
FIG. 3 is an isometric view of an actuator system, according to an aspect of the present disclosure.

FIG. 3 is an isometric view of an exemplary embodiment of the actuator system 251 that is provided within the cab 104, according to an aspect of the present disclosure. The transmission range actuator 252 includes a base 300 with a first end 300*a* and a second end 300*b* opposite to the first end 300*a*. A grip 302 is mounted to or extends monolithically from the first end 300*a*, and may be used by an operator to grasp the transmission range actuator 252. A first housing 304 may extend from, or may be mounted on, the second end 300*b* of the base 300. The first housing 304 may include a first wall 304*a* and a second 304*b* defining a space there between in which the positioning mode actuator 256 may be moved.

An extension 308 may be attached or formed to extend from a lower portion of the base 300 through a second housing 310 of the transmission range actuator 252 into the machine 100. The extension 308 may be a rod or other type of shaft that may extend through a track 312 of the second housing 310 and be connected to the transmission 204 by a mechanical or electromechanical linkage. A range actuator lock 314 is positioned on the grip 302, and may be pressed to move towards the grip 302 in a direction substantially parallel to an axis of rotation 306 of the positioning mode actuator 256.

An operator may move the range actuator lock 314 inward towards the grip 302 to release the transmission range actuator 252 from a locked position, and move the transmission range actuator 252 along the path defined by the track 312 from the front towards the rear of the machine 100, and vice versa. Movement of the extension 308 along the track 312 may correspond to a change in the transmission range of the transmission 204, as displayed by a transmission range indicator 316 provided in the second housing 310. The transmission range indicator 316 may include devices, such as LEDs or other illumination devices, that are activated according to a position of the transmission range actuator 252 along the track 312, for individual range indicators, P, R, N, D, 2, 1 respectively corresponding to a parked state of the machine 100, and transmission ranges including reverse, neutral, drive (automatic gear changing), drive in a second gear, and drive in a first gear.

The multi-auto mode enablement actuator 253 (shown FIG. 2, not shown in FIG. 3) may provide a switch that activates or deactivates a mode of the main controller 260 (hereafter referred to as "multi-auto mode") for enabling selection and actuation of different modes of operating the hoist system 270 in response to various operations of the multi-system mode actuator 254 and/or the positioning mode actuator 256. According to an aspect of the present disclosure, an activation state of the multi-auto mode being active enables an operator to select, and the main controller 260 to thereby actuate, respective first modes for operating the hoist system 270 to automatically lower and raise the body 120 (hereafter referred to as "first auto lower mode" and "first auto raise mode") in response to specific operations of the positioning mode actuator 256. Further, where the activation state of the multi-auto mode is active, an activation state of a mode of the main controller 260 for responding to operations of the multi-system mode actuator 254 (hereafter referred to as "response mode") is active. Where the activation state of the response mode is active, in response to operations of the multi-system mode actuator 254, the main controller 260 may change an activation state of a mode of the main controller 260 for enabling selection and actuation of additional modes of operating the hoist system 270 assisted by one or more of the engine 202, the transmission 204, and the brake system 230 (hereafter referred to as "multi-system mode") in response to operations of the positioning mode actuator 256.

With the activation states of both the multi-auto mode and the multi-system mode being active, in addition to being able to select and thereby actuate the first auto lower mode and the first auto raise mode for operating the hoist system 270, an operator may operate the positioning mode actuator 256 and select respective second modes for operating the hoist system 270 to automatically lower and raise the body 120 (hereafter referred to as "second auto lower mode" and "second auto raise mode"). Each of the second auto lower mode and the second auto raise mode may include coupling respective operations of the hoist system 270 with automatic operations of one or more of the engine 202, the transmission 204, and the brake system 230 as described in more detail below with reference to FIGS. 6 and 7. If the activation state of only the multi-auto mode is active, operation of the positioning mode actuator 256 will not actuate either of the second modes for operating the hoist system 270 to automatically lower and raise the body 120.

If the activation state of the multi-auto mode is not active ("inactive"), only the first auto lower mode of the auto raise and lower modes may be selected by an operator and executed by the main controller 260 operating the hoist system 270. Further, the operation of the multi-system mode actuator 254 will not change the activation state of the multi-system mode if the activation state of the multi-auto mode is inactive, and an operator will not be enabled to select either of the second auto lower or auto raise modes for operating the hoist system 270. In addition, changing the activation state of the multi-auto mode from active to inactive will result in the activation state of the multi-system mode remaining or changing to inactive.

According to an aspect of the present disclosure, the multi-auto mode enablement actuator 253 (shown FIG. 2, not shown in FIG. 3) may include a button similar to the multi-system mode actuator 254 described in more detail below with reference to FIG. 3. According to another aspect of the present disclosure, the multi-auto mode enablement actuator 253 may be provided as a button or lever on the transmission range actuator 252. According to yet another aspect of the present disclosure, the multi-auto mode enablement actuator 253 may include a touch sensitive interface such as a panel or display screen. For any of the configurations for the multi-auto mode enablement actuator 253 described herein, the multi-auto mode enablement actuator 253 may be installed in the second housing 310, next to the multi-system mode actuator 254, on the transmission range actuator 252, or on a dashboard (not shown) in the cab 104.

The multi-system mode actuator 254 may be positioned within the cab 104 proximate to the second housing 310 and may include a button as illustrated in FIG. 3. The button may provide a switch that changes the activation state of the multi-system mode of the main controller 260 for responding to operations of the positioning mode actuator 256 and implementing at least the respective second modes for operating the hoist system 270 to automatically lower and raise the body 120. Depending on a configuration of the multi-system mode actuator 254, the multi-system mode actuator 254 may be depressed and lifted, depressed a series of times, or lifted a series of times according to a hand operation(s) by an operator and change the activation state of the multi-system mode between active and inactive. It will be appreciated that the multi-system mode actuator 254 may be positioned in multiple locations within the cab 104, including on the transmission range actuator 252.

The positioning mode actuator 256 may be attached to the first wall 304a and the second wall 304b, and/or the base 300, such that the positioning mode actuator 256 may be hand operated to pivot in opposite directions about the axis of rotation 306. The direction of movement of the body 120, and mode of operation of the hoist system 270 resulting from a displacement of the positioning mode actuator 256 from a central position, may be displayed by a positioning mode indicator 318 provided in the second housing 310. The positioning mode indicator 318 may include devices, such as LEDs or other illumination devices, which are activated according to a displacement of the positioning mode actuator 256 and the activation states of the multi-auto and multi-system modes, for individual mode indicators A↑, M↑, M↓, and A↓, respectively corresponding to an auto lower mode, a manual lower mode, a manual raise mode, and an auto raise mode. It will be understood that in a situation where an ejector of a machine, such as a machine 1000 illustrated in FIG. 10 and discussed in further detail below, is controlled by the positioning mode actuator 256, the individual mode indicators A↑, M↑, M↓, and A↓, may respectively correspond to an auto retract mode, a manual retract mode, a manual eject mode, and an auto eject mode of the ejector.

The automatic brake actuator 258 is positioned on the grip 302 of the transmission range actuator 252 below the range actuator lock 314. Accordingly, an operator may access and operate each of the positioning mode actuator 256, the automatic brake actuator 258, and the range actuator lock 314 with a single hand.

Figure 4:
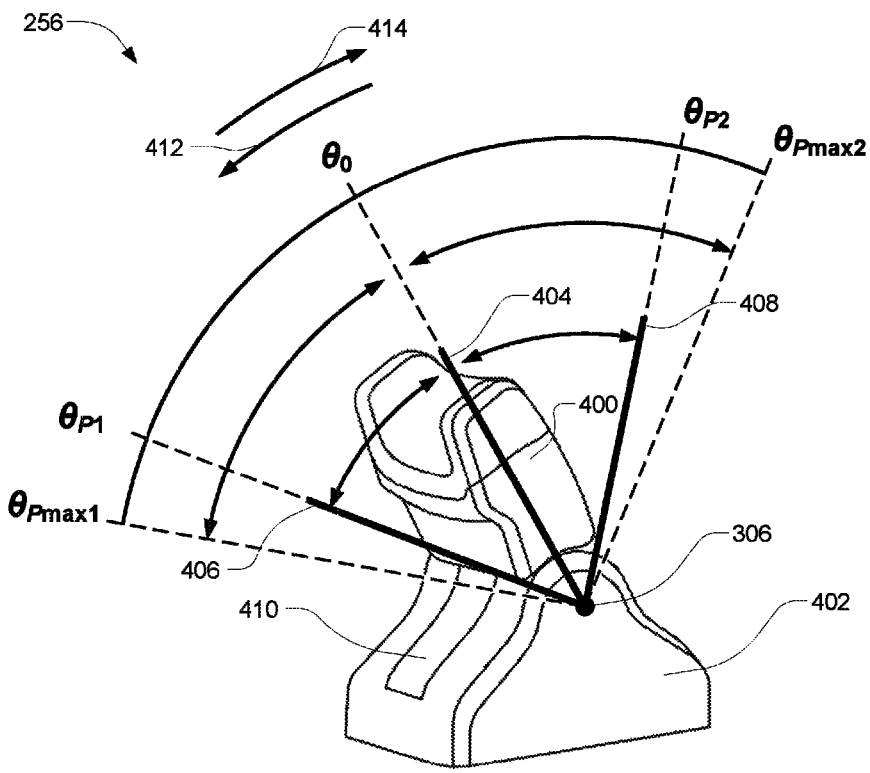
FIG. 4 is an isometric view of a positioning mode actuator, according to an aspect of the present disclosure.

FIG. 4 is an isometric view of the positioning mode actuator 256, according to an aspect of the present disclosure. As illustrated in FIG. 4, the positioning mode actuator 256 includes a lever 400 mounted on an actuator base 402 to pivot about the axis of rotation 306 from the center position where a lever position $\theta_P$ is equal to 0° (hereafter referred to as "the center position $\theta_0$"). The lever 400 may pivot from the center position $\theta_0$ in a first operating direction 412 to a first end position $\theta_{Pmax1}$, and in an opposite second operating 414 direction to a second end position $\theta_{Pmax2}$. The positioning mode actuator 256 may include stoppers at each of the first end position $\theta_{Pmax1}$ and the second end position $\theta_{Pmax2}$ to limit the movement of the lever 400. As discussed below with reference to FIG. 5, an angle between the center position $\theta_0$ and each of the first end position $\theta_{Pmax1}$ and the second end position $\theta_{Pmax2}$ is equal to 30°. However, one of ordinary skill in the art will recognize that an angle from the center position $\theta_0$ to either of the first end position $\theta_{Pmax1}$ and the second end position $\theta_{Pmax2}$ may be greater or less than 30°.

A center line 404 illustrated in FIG. 4 represents a center detent (hereafter referred to as "center detent 404") that although not shown, may be provided within the actuator base 402 in a location corresponding to the center position $\theta_0$. A first line 406 illustrated in FIG. 4 represents a first detent (hereafter referred to as "first detent 406") that although not shown, may be provided within the actuator base 402 in a location corresponding to a first intermediate position $\theta_{P1}$. In addition, a second line 408 illustrated in FIG. 4 represents a second detent (hereafter referred to as "second detent 408") that although not shown, may be provided within the actuator base 402 in a location corresponding to a second intermediate position $\theta_{P2}$. As discussed below with reference to FIG. 5, an angle between the center position $\theta_0$ and each of the first intermediate position $\theta_{P1}$ and the second intermediate position $\theta_{P2}$ is equal to about 25°. However, one of ordinary skill in the art will recognize that an angle from the center position $\theta_0$ to either of the first intermediate position $\theta_{P1}$ and the second intermediate position $\theta_{P2}$ may be greater or less than 25°.

A contact structure (not shown) may be attached to, or extended from, the lever 400, and extend through a lever track 410 to slidably engage with the center detent 404, the first detent 406, and the second detent 408. The contact structure may provide a tactile and/or audible sensation, such as a snap, as the lever 400 is pivoted about the axis of rotation 306 and the contact structure is moved past the respective detents. Thus, each of the first detent 406 and second detent 408 may partially impede the displacement of the positioning mode actuator 256 such that an operator may appreciate some resistance when the positioning mode actuator 256 is being displaced past the first detent 406 or the second detent 408. In addition, the positioning mode actuator 256 may include a mechanism, for example retractable stoppers, responsive to the activation state of the multi-auto mode being active and/or the activation state of the multi-system mode being active, to change a tactile and/or audible sensation when the first detent 406 and/or the second detent 408 are engaged. Accordingly, the operation of the multi-auto mode enablement actuator 253 and/or the multi-system mode actuator 254 may actuate the mechanism of the positioning mode actuator 256 to change a tactile and/or audible sensation when the first detent 406 and/or the second detent 408 are engaged.

According to an aspect of the present disclosure, the first detent 406 may be engaged by the lever 400 according to a first detent front engagement where the lever 400 is moved in the first operating direction 412 to or beyond the first intermediate position $\theta_{P1}$. The first detent 406 may be engaged by the lever 400 according to a first detent return engagement where the lever 400 is moved in the second operating direction 414 from the first end position $\theta_{Pmax1}$, or a position between the first end position $\theta_{Pmax1}$ and the first intermediate position $\theta_{P1}$, to a position beyond the first intermediate position $\theta_{P1}$ but not past the center detent 404. The first detent return engagement may occur subsequent to the first detent front engagement, as a result of the a return action of the lever 400 coupled with an operator releasing the lever 400, or by the operator manually moving the lever 400 in the second operating direction 414 beyond the first intermediate position $\theta_{P1}$.

Any suitable type of electrical, mechanical, or electromechanical contacts may be operatively associated with the contact structure of the lever 400 to register the lever position Op, and movement the of the lever 400 between the first end position $\theta_{Pmax1}$, the first intermediate position $\theta_{P1}$, the center position $\theta_0$, the second intermediate position $\theta_{P2}$, and the second end position $\theta_{Pmax2}$. Accordingly, selected engagement of the various contacts (e.g. detents) may produce an operator input signal such as an electrical or electronic signal indicative of an operator's desired input. This information may be communicated to the main controller 260 for appropriate processing.

According to another aspect of the present disclosure, the second detent 408 may be engaged by the lever 400 according to a second detent front engagement where the lever 400 is moved in the second operating direction 414 to or beyond the second intermediate position $\theta_{P2}$. The second detent 408 may be engaged by the lever 400 according to a second detent return engagement in which the lever 400, subsequent to the second detent front engagement, is moved in the first operating direction 412 from the second end position $\theta_{Pmax2}$, or a position between the second end position $\theta_{Pmax2}$ and the second intermediate position $\theta_{P2}$, to a position beyond the second intermediate position $\theta_{P2}$ but not past the center detent 404. The second detent return engagement may occur as a result of the return action of the lever 400 or a manual control by an operator.

The lever 400 is spring-actuated, or otherwise biased towards the center position $\theta_0$ to provide the return action of the lever 400; and the first detent 406 and the second detent 408 are soft detents. Accordingly, in a normal state the lever 400 is engaged with the center detent 404. Alternatively, the first detent 406 and the second detent 408 may be lock detents, and respectively constrain the lever 400 in the first intermediate position $\theta_{P1}$ and the second intermediate position $\theta_{P2}$ absent further forcible movement of lever 400.

It will be understood the that the lever 400 may be provided in different configurations such that the lever 400 is operated according to different movement schemes (e.g. forward and backward, left and right, upward and downward, etc.), and engage components located in center, first intermediate, first end, second intermediate, and second end positions which are located according to respective movement schemes.

Figure 5:
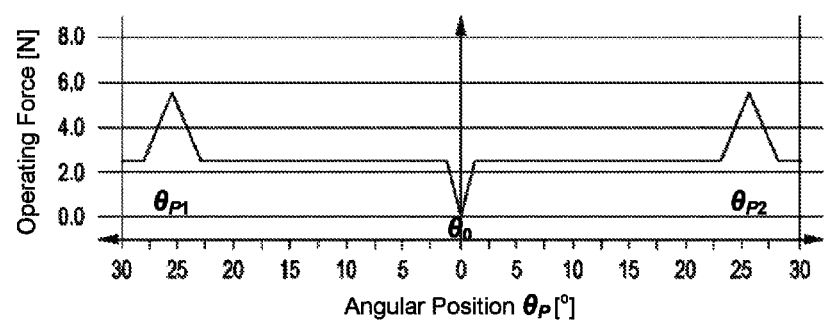
FIG. 5 is a graph of operating force applied to a lever versus lever position over a respective range of motion, according to an aspect of the present disclosure.

FIG. 5 is a graph of operating force applied to the lever 400 versus the lever position θp over a respective range of motion, according to an aspect of the present disclosure. In a situation in which the lever 400 is moved from the center position $\theta_0$, for example in the first operating direction 412 towards the first end position $\theta_{Pmax1}$, an operator must apply an operating force greater than 2.0 N to move the lever 400 in the first operating direction 412 from an engagement with the center detent 404. Once the operator moves/pushes the lever 400 just over 20° in the first operating direction 412 from the center position $\theta_0$, the operating force required to continue to move the lever 400 in the first operating direction 412 is increased. As illustrated in FIG. 5, the operating force increases to greater than 4.0 N to continue to move the lever 400 more than 25°, i.e. through an engagement with the first detent 406 and beyond the first intermediate position $\theta_{P1}$. A similar operating force profile is required for a movement of the lever 400 in the second operating direction 414 from the center position $\theta_0$ to the second end position $\theta_{Pmax2}$.

One of ordinary skill in the art will recognize that the respective operating forces illustrated in FIG. 5 are exemplary. According to an aspect of the present disclosure, forces required to move the lever 400 through the first detent 406 and/or the second detent 408 may be changed by the main controller 260 according to the activation state of the multi-auto mode and/or the activation state of the multi-system mode.

INDUSTRIAL APPLICABILITY

Industrial applicability of the system, methods, and computer readable medium for operating a hoist system or an ejector herein described will be readily appreciated from the foregoing discussion.

Figure 6:
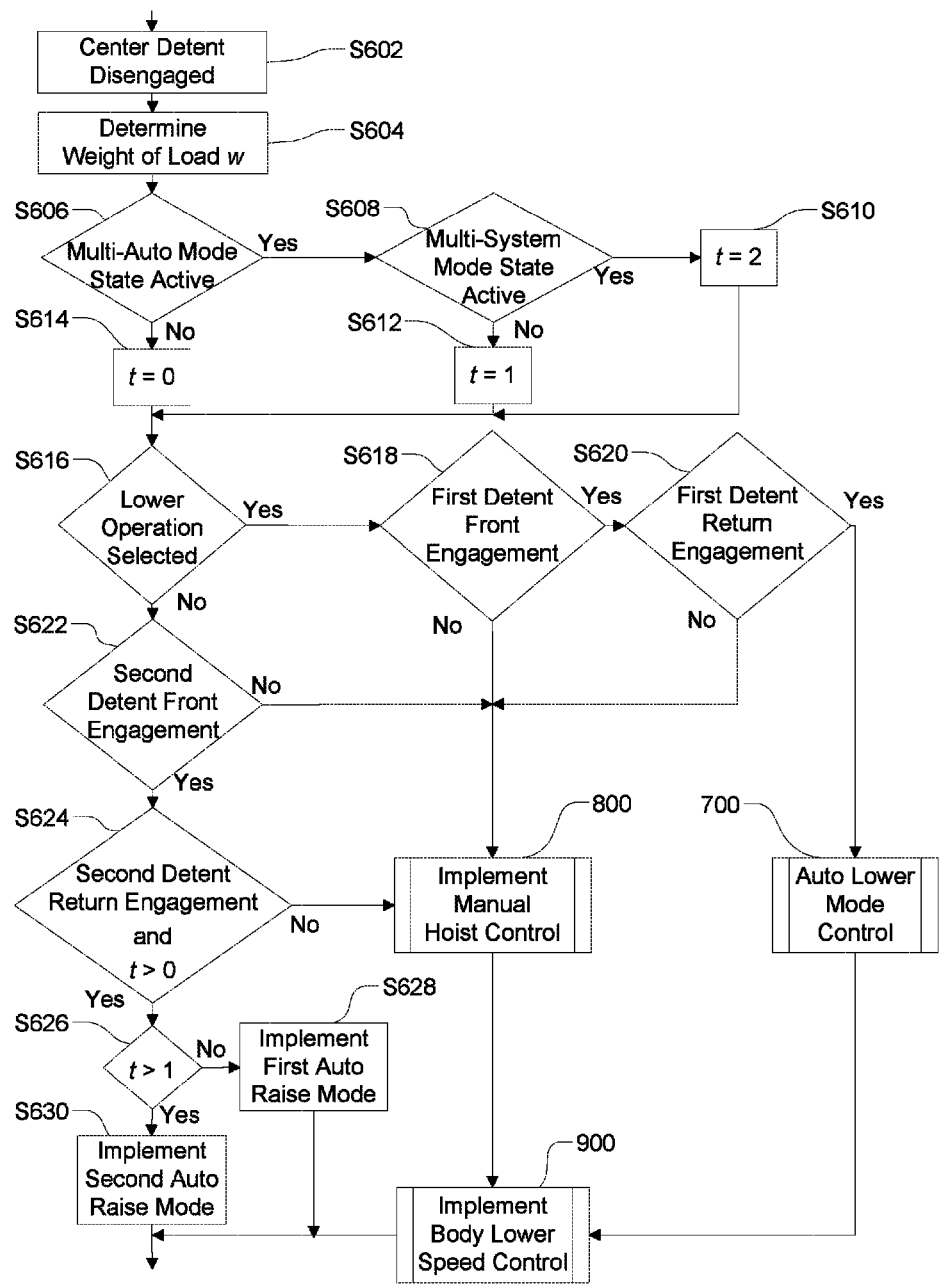
FIG. 6 is an algorithmic flowchart illustrating a method of controlling a hoist system mode of operation, according to an aspect of the present disclosure.

FIG. 6 is an algorithmic flowchart illustrating a method of controlling a hoist system mode of operation 600, according to an aspect of the present disclosure. For illustration, the operations of the method of FIG. 6 will be discussed in reference to FIGS. 1-5.

In block S602, the main controller 260 receives a signal that the positioning mode actuator 256 is disengaged from the center detent 404. In block S604, the main controller 260 determines the weight w of the load including the body 120 based on data from the weight sensor 290.

In block S606, the main controller 260 determines whether the activation state of the multi-auto mode for operating the hoist system 270 is active or inactive. Where the activation state of the multi-auto mode is active, the main controller 260 determines whether the activation state of the multi-system mode of the hoist system 270 is active or inactive, in block S608. Depending on whether the activation state of the multi-system mode is active or inactive, the main controller 260 sets an algorithmic variable t equal to 2 or 1 in block S610 or block S612, respectively. Where the activation state of the multi-auto mode is determined to be inactive in block S606, the main controller 260 sets the algorithmic variable t equal to 0 in block S614.

The main controller 260 accesses the positioning mode actuator 256 to determine the lever position $\theta_P$ in block S616 in order to determine whether a raising or lowering operation has been selected according to the operating direction of the lever 400. Where it is determined the lowering operation is selected in block S616, the main controller 260 determines whether the first detent 406 has been engaged by the lever 400 according to the first detent front engagement in block S618. Where the condition in block S618 is satisfied, the main controller 260 determines if the lever 400 has engaged the first detent 406 according to the first detent return engagement in block S620 in order to determine whether to execute a selected auto lower mode implementation algorithm 700.

Where the main controller 260 determines in block S616 that the lowering operation has not been selected, the main controller 260 determines whether there has been an engagement of the second detent 408 by the lever 400 in block S622. In a case where the main controller 260 determines there has been an engagement of the second detent 408 according to the second detent front engagement, in block S624, the main controller 260 determines (1) if there has been an engagement of the second detent 408 according to the second detent return engagement, and (2) if the value of the algorithmic variable t is greater than 0.

Where both conditions of block S624 are satisfied, the main controller 260 determines if the value of the algorithmic variable t is greater than 1 in block S626. Thus, depending on the activation state of the multi-system mode as evaluated in block S606 and S608, the main controller 260 may implement the first auto raise mode or the second auto raise mode in block S628 or block S630 respectively. The main controller 260 implements the first or second auto raise modes by operating the hoist system 270, for example via an Electronic Control Module (ECM), to raise the body 120 to the second body position B automatically.

In implementing the second auto raise mode in block S620 the main controller may incorporate automatic operations of other systems according to the multi-system mode. Thus, in response to operations of the multi-system mode actuator 254 and the positioning mode actuator 256, in block S630, the main controller 260 may operate the hoist system 270 to automatically raise the body 120 and implement simultaneously and/or sequentially, one or more, all, or none of several automatic operations of the engine 202, the transmission 204, and the brake system 230. The second auto raise mode may include an assisted automatic operation of the hoist system 270 including the main controller 260: determining the machine 100 is stationary and communicating with the brake controller 232 to operate, for example via an ECM, the brake devices 234 prior to moving the body 120; operating the transmission 204, for example via an ECM, to automatically change the transmission range to the neutral transmission range prior to moving the body 120; operating the engine 202, for example via an ECM, to adjust an output of the engine 202 in an idle state to increase or decrease an output of the pump 272 and transmit a force generated by the engine 202 to the hoist device 130 according to a position of the body 120 as the body moves; and operating the hoist system 270 to automatically raise the body 120 while the speed (e.g. a hoist ramp rate) of the raising motion is (1) controlled by the automatic operation of the engine 202, or (2) depends from an operation by an operator of the throttle 238.

Each of these automatic operations, or different phases of each of these automatic operations of the engine 202, transmission 204, or brake system 230 may be initiated in response to various operations of the hoist system 270 moving the body 120 automatically, or in response to a state of the body 120 (e.g. position, ramp rate, etc.) at any time while being moved automatically. In addition, the assisted automatic operation of the hoist system 270 may include the main controller 260 responding to various operator inputs or accessing a plurality of sensors, such as a sensor that monitors the motion of the machine 100, a sensor that detects a roll angle between the first frame 102 and the second frame 110, the position sensor 288, or the weight sensor 290, and modifying or canceling one or more, all, or none of the respective automatic operations the engine 202, the transmission 204, the brake system 230, and the hoist system 270.

However, if the conditions in block S618, block S620, block S622, or block S624 are not satisfied, as evaluated in the course of performing the method of controlling a hoist system mode of operation 600, the main controller 260 executes a manual hoist control implementation algorithm 800.

Figure 7:
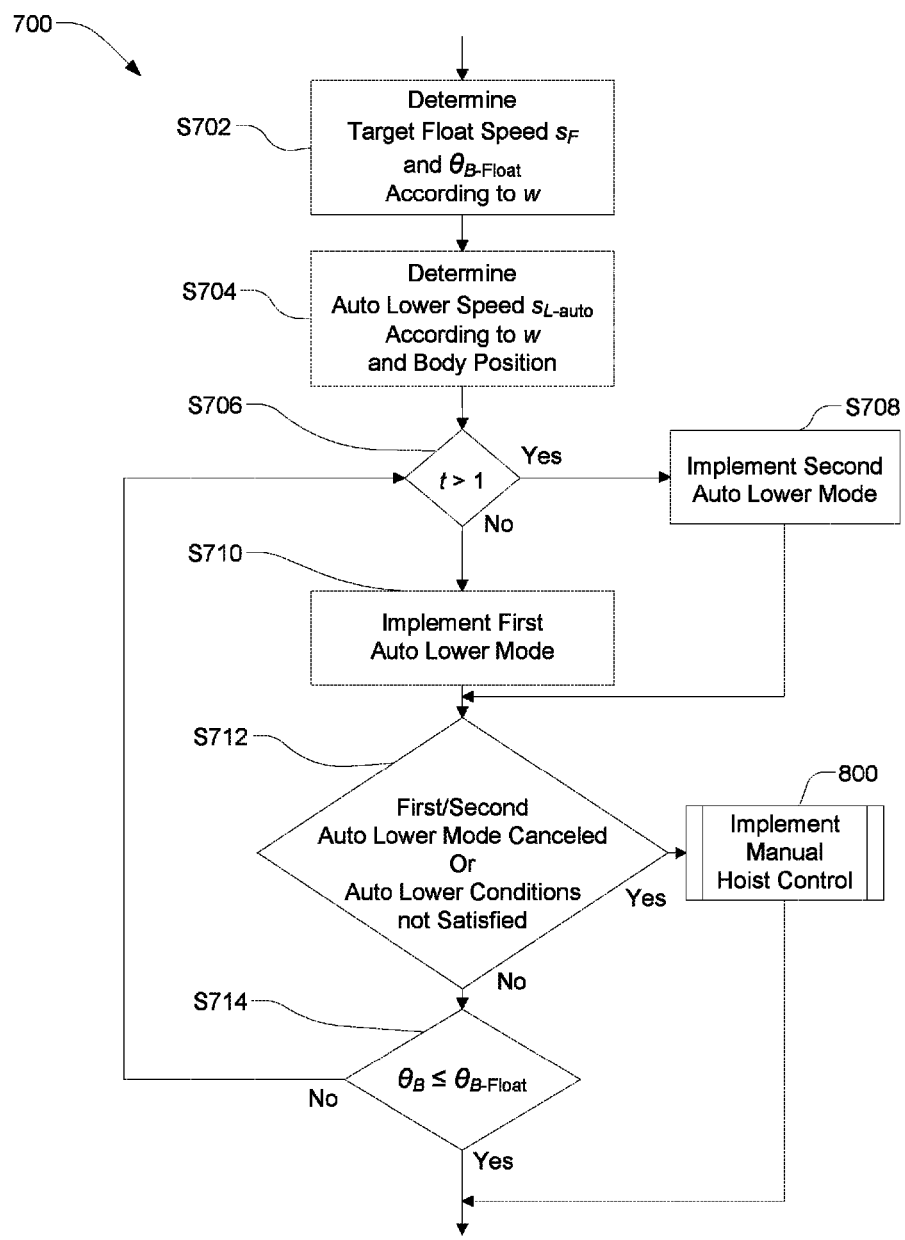
FIG. 7 is an algorithmic flowchart illustrating a method for implementing a selected auto lower mode of operation of a hoist system for automatically lowering a body, according to an aspect of the present disclosure.

An example of the selected auto lower mode implementation algorithm 700 is provided by an algorithmic flowchart of FIG. 7, which illustrates a method of implementing a selected auto lower mode of operation for the hoist system 270, according to an aspect of the present disclosure.

In block S702, the main controller 260 determines a float position $\theta_{B\text{-}Float}$ and a target float speed $s_F$ based on the weight w of the load from block S604. The float position $\theta_{B\text{-}Float}$ corresponds to an angular position of the body 120 from which the hoist system 270 will passively move the body 120 to the first body position A (the float operation). The target float speed $s_F$ corresponds to an estimated speed at which the body 120 is to move from the float position $\theta_{B\text{-}Float}$ to first body position A. As described in more detail with reference to FIG. 9, the target float speed $s_F$ may be effected according to a valve operation scheme for modulating a degree of opening/closing of the valve 274 during a lowering movement of the body 120. The modulation of the opening/closing of the valve 274 may be effected by a modulation of current or operation of other mechanisms that may move a valve member to vary/redirect a flow rate of fluid through the valve 274.

According to one aspect of the present disclosure the main controller 260 may optionally determine an auto lower speed $s_{L\text{-}auto}$ based on the weight w of the load and a current angular position of the body 120 in block S704. According to another aspect of the present disclosure the auto lower speed $s_{L\text{-}auto}$ may be dependent on the auto lower mode selected (i.e. first or second). The auto lower speed $s_{L\text{-}auto}$ corresponds to the speed the body 120 is lowered by the operation of the hoist system 270 before the position of the body 120 is equal to the float position $\theta_{B\text{-}Float}$. According to another aspect of the present disclosure, the main controller 260 may have one default value for both, or respective default values for each of the first auto lower mode and the second auto lower mode, for the auto lower speed $s_{L\text{-}auto}$.

In block S706, the main controller 260 evaluates the value of the algorithmic variable t. The main controller 260 determines the algorithmic variable t is greater than 1 and operates the hoist system 270 in block S708 according second auto lower mode to lower the body 120 at the auto lower speed $s_{L\text{-}auto}$. Similar to an operation(s) in block S630, the main controller 260 operates the hoist system 270 to automatically lower the body 120, and may implement simultaneously and/or sequentially, one or more, all, or none of several automatic operations of the engine 202, the transmission 204, and the brake system 230 according to the multi-system mode (assisted automatic operation of the hoist system 270). Where the algorithmic variable t is determined not to be greater than 1 in block S706, the body 120 is lowered by the hoist system 270 from current position (a first position) at the auto lower speed $s_{L\text{-}auto}$ according to the first auto lower mode in block S710. The hoist system 270 being operated by the main controller 260, for example via an ECM.

In block S712, the main controller 260 determines if the selected one of first or second auto lower modes has been canceled, or if required conditions for automatically lowering the body (hereafter referred to as "auto lower conditions") are not/or no longer satisfied. Either the first or second auto lower mode may have been canceled (i.e. an activation state of the auto lower mode may have been changed from active to inactive) by a disengagement of the lever 400 from the center detent 404 following the first detent return engagement. The auto lower conditions that may no longer be satisfied may correspond to threshold values for data obtained from any of the sensors described herein. In the case of the second auto lower mode including an assisted automatic operation of the hoist system 270 in block S708, the threshold values for the plurality of sensors may correspond to operational conditions for the automatic operations of the engine 202, transmission 204, or brake system 230, as well as auto lower conditions of the hoist system 270 that must be satisfied.

Where it is determined the first or second auto lower mode has not been canceled and the auto lower conditions are satisfied, the main controller 260 communicates with the position sensor 288 in block S714 to obtain the body position $\theta_B$. In addition, the main controller 260 compares the body position $\theta_B$ to the float position $\theta_{B\text{-}Float}$ determined in block S704. If the main controller 260 determines the body position $\theta_B$ is equal to or less than the float position $\theta_{B\text{-}Float}$, the main controller 260 completes the selected auto lower mode implementation algorithm 700. For the purposes of the method of controlling a hoist system mode of operation 600, the body 120 may be considered to be at a second position. As a result, the main controller 260 executes a body lower speed control implementation algorithm 900 per the method of controlling a hoist system mode of operation 600 illustrated in FIG. 6. If the body position $\theta_B$ is not equal to or less than the float position $\theta_{B\text{-}Float}$, the main controller 260 lowers the body 120 via block S708 or block S710 until one of the conditions in block S712 or block S714 is satisfied. If one of the conditions in block S712 is satisfied the main controller 260 executes the manual hoist control implementation algorithm 800.

Figure 8:
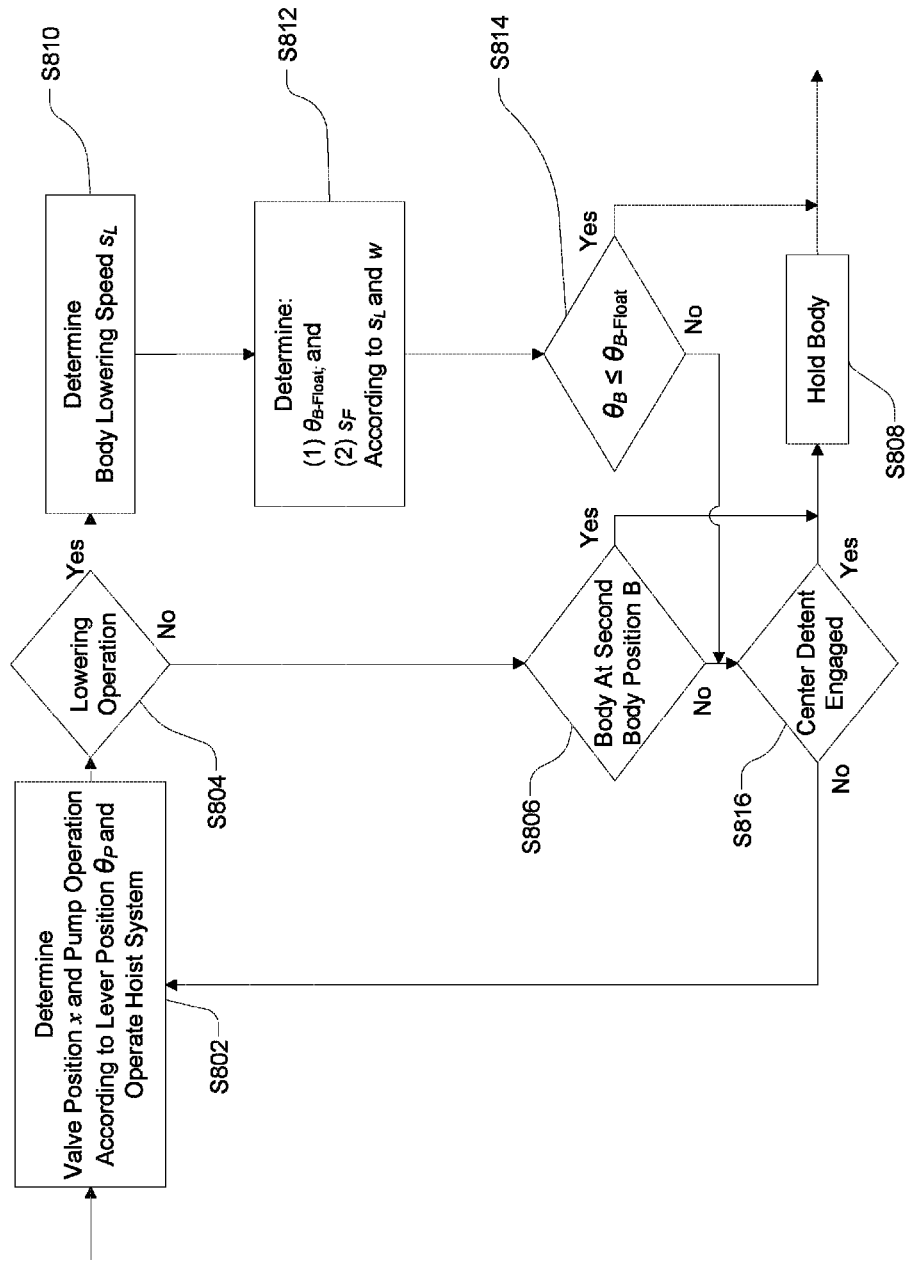
FIG. 8 is an algorithmic flowchart illustrating a method of implementing a manual hoist control mode for a hoist system, according to an aspect of the present disclosure.
Figure 9:
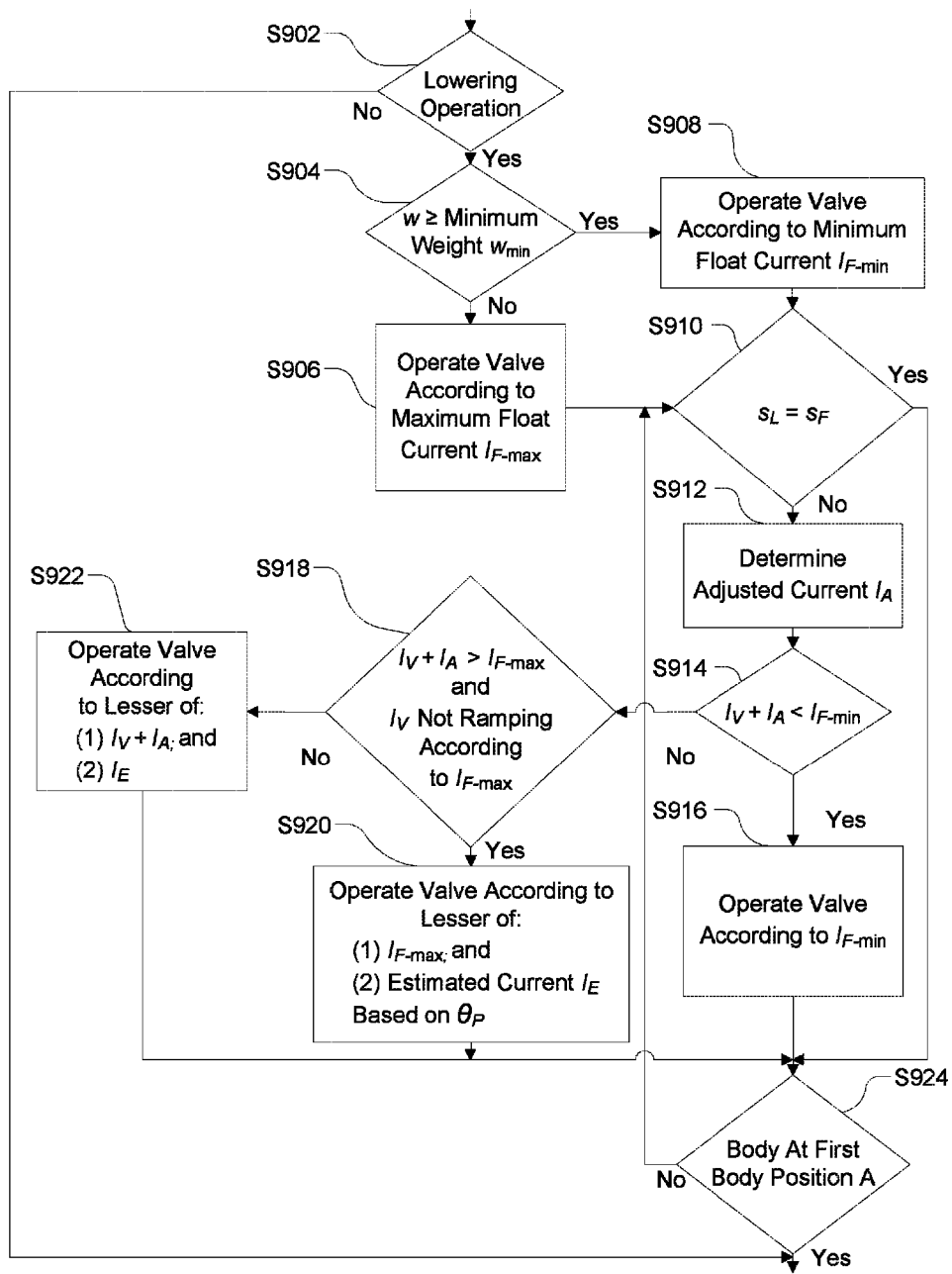
FIG. 9 is an algorithmic flowchart illustrating a method of controlling a body lower speed using a hoist system, according to an aspect of the present disclosure.

An example of the manual hoist control implementation algorithm 800 is provided by an algorithmic flowchart of FIG. 8, which illustrates a method of implementing a manual hoist control for the hoist system 270, according to an aspect of the present disclosure.

The range of motion for the lever 400 between the first intermediate position $\theta_{P1}$ and the second intermediate position $\theta_{P2}$ defines a manual modulation range of the positioning mode actuator 256 for an operator to manually control movement of the body 120. Signals from the main controller 260 for positioning the valve 274 and operating the pump 272 are mapped to a lower modulation range ($\theta_0$ to $\theta_{P1}$) and a raise modulation range ($\theta_0$ to $\theta_{P2}$) of the lever 400. Each location along the lower modulation range ($\theta_0$ to $\theta_{P1}$) and the raise modulation range ($\theta_0$ to $\theta_{P2}$) may correspond to a respective valve position x of the valve 274 and power input/flow output setting of the pump 272. Thus, implementing a given valve position x and operation of the pump 272 (e.g. current supply, output, flowrate, etc.) corresponding to a given lever position $\theta_P$ within the manual modulation range affects: (1) a degree of fluid communication between ports of the valve 274 and the first fluid port 284 and the second fluid port 286 of the hoist device 130; (2) a direction and flow rate of a fluid to/from the actuator cylinders 280; and (c) a speed of motion the of driven members 282 within the actuator cylinders 280.

In block S802, the main controller 260 determines the valve position x for the valve 274 and operation of the pump 272 according to the lever position $\theta_P$. Further in block S802, the main controller 260, via an ECM for example, operates the hoist system 270 to move the body 120, which includes moving the valve 274 to the determined valve position x and operating the pump 272 according to the determined operation. The direction of motion of the body 120 is checked in block S804, and if the raise operation is being implemented the main controller 260 accesses the position sensor 288 and determines whether the body 120 is at the second body position B in block S806. From block S806, unless the body 120 is not located at the second body position B, the main controller 260 operates the hoist system 270 to hold the body 120 at the second body position B in block S808.

In the case where the body 120 is being lowered, the main controller 260 accesses the position sensor 288 and determines a body lowering speed $s_L$ in block S810. The body lowering speed $s_L$ corresponds to an actual speed the body 120 is lowering towards the first body position A. For any current lowering movement of the body 120, the main controller 260 may access previously detected values for the position of the body 120 and time values at which the position values were detected. The main controller 260 may compare the position values versus the time values to determine the body lowering speed $s_L$ in block S810. According to another aspect of the present disclosure, an angular velocity sensor may be provided on the body 120 and the main controller 260 may access the angular velocity sensor to determine the body lowering speed Based on the weight w determined in block S604 and the body lowering speed $s_L$ determined in block S810, the main controller 260 determines the float position $\theta_{B\text{-}Float}$ and the target float speed $s_F$ in block S812. In block S814, the main controller 260 determines whether the body position $\theta_B$ is equal to or less than the float position $\theta_{B\text{-}Float}$.

It may be determined that the body position $\theta_B$ is not equal to or less than the float position $\theta_{B\text{-}Float}$ in block S814 (i.e. the body 120 is not in or past the float position $\theta_{B\text{-}Float}$), and the main controller 260 accesses the positioning mode actuator 256 to determine if the center detent 404 has been engaged in block S816. The main controller 260 also determines if the condition in block S816 is satisfied if it is determined the body 120 is not at the second body position B in block S806. The main controller 260 operates the valve 274 to be in the third valve position and hold the body 120 in a current position in block S808 in response to the condition in block S816 being satisfied. The lever 400 being reengaged with the center detent 404 may correspond to an operator ending the manual operation of hoist system 270 to move the body 120. However, if the lever 400 is positioned within lower modulation range ($\theta_0$ to $\theta_{P1}$) or the raise modulation range ($\theta_0$ to $\theta_{P2}$), the condition in block S816 is not satisfied and the main controller 260 again determines the valve position x and pump operation, and operates the hoist system 270 in block S802. A change from the raise modulation range to the lower modulation range, or vice versa, also results in the main controller 260 determining the valve position x and pump operation, and operating the hoist system 270 in block S802.

Where it is determined in block S814 that the body position $\theta_B$ is equal to or less than the float position $\theta_{B-Float}$, the main controller 260 completes manual hoist control implementation algorithm 800 and executes a body lower speed control implementation algorithm 900 per the method of controlling a hoist system mode of operation 600 illustrated in FIG. 6. An example of the body lower speed control implementation algorithm 900 is provided by an algorithmic flowchart of FIG. 9, which illustrates an exemplary method of controlling the body lower speed control $s_L$ with the hoist system 270, according to an aspect of the present disclosure.

In block S902, the main controller 260 determines a current operation of the hoist system 270 includes lowering the body 120. The main controller 260 completes the body lower speed control implementation algorithm 900 if the body 120 is not being lowered, for example as a result of the body 120 being positioned in hold position in block S808.

The main controller 260 determines the current operation of the hoist system 270 includes lowering the body 120 in block S902 and compares the weight w of the body 120 determined in block S604 to a threshold minimum weight $w_{min}$. The minimum weight $w_{min}$ may be a predetermined value corresponding to a weight of the body 120 when the body 120 is empty plus a weight of a minimum load carried in the body 120 which is specific to the machine 100, a material most often carried, or other known factors. Accordingly, the minimum weight $w_{min}$ represents a minimum weight when the body 120 is loaded.

The main controller 260 determines the weight w of the body 120 is not greater than or equal to the minimum weight $w_{min}$ in block S904, and operates the hoist system 270 in block S906 such that a valve current $I_V$ supplied for operating the valve 274 is ramped according to a maximum float current $I_{F-max}$. However, where the main controller 260 determines the weight w of the body 120 is greater than or equal to the minimum weight $w_m$ in block S904, the valve current $I_V$ for operating the valve 274 is ramped according to a minimum float current $I_{F-min}$ in block S908. A magnitude of the minimum float current $I_{F-min}$ and corresponding operation of the valve 274 being different than those of the maximum float current $I_{F-max}$. The term ramp, as recited herein with respect to changing the valve current $I_V$ according to either of the maximum float current $I_{F-max}$ or the minimum float current $I_{F-max}$, may refer to an increase or a decrease in magnitude of an instant valve current $I_V$ being supplied to operate the valve 274.

During the float operation, the body 120 is not powered down, but passively lowered by the hoist system 270 in a controlled movement under its own weight from a current position to the first body position A. The current position of the body being equal to or less than the float position $\theta_{B-Float}$ as determined in block S714 or block S814. A force applied to the second frame 110 by the body 120 when the body 120 reaches the first body position A via the float operation, is proportional to the weight w of the body 120 and a change in the body lowering speed $s_L$ (an acceleration of the body 120) prior to reaching the first body position A. (The flowrate of fluid from the actuator cylinders 280, for example from the first fluid port 284, corresponds to a lack of resistance opposing, and affects/increases a speed, of movement of the driven members 282 within the actuator cylinders 280 (and the body lowering speed $s_L$) during the float operation.

Ramping the valve current $I_V$ according to the maximum float current $I_{F-max}$ corresponds to an operation of the valve 274 allowing minimally restricted fluid communication between the actuator cylinders 280 and the fluid tank 276 or atmosphere. Ramping the valve current $I_V$ according to the minimum float current $I_{F-min}$ corresponds to an operation of the valve 274 with more restricted fluid communication between the actuator cylinders 280 and the fluid tank 276 or atmosphere than the maximum float current $I_{F-max}$. Thus, the body lowering speed $s_L$ may be higher and a change in the body lowering speed $s_L$ may be greater in magnitude during the float operation when the weight w is less than the minimum weight $w_{min}$ and the valve current $I_V$ is ramped according to the maximum float current $I_{F-max}$, than if the valve current $I_V$ is ramped according to the minimum float current $I_{F-min}$ when the weight w is greater than the minimum weight $w_{min}$. As a result, relative to the weight of the body 120 and any load therein, the operation of the hoist system 270 according to block S904, and block S906 or block S908, may optimize an amount of time over which the float operation is performed, while minimizing the force applied to the second frame 110 by the body 120 reaching the first body position A.

The valve 274 may include, for example, a solenoid that controls a movement of a valve member to restrict or permit fluid communication to or from the actuator cylinders 280. The main controller 260 may implement each valve position (i.e. first, second, third, and fourth valve positions) fully or partially by modulating the valve current $I_V$ supplied to the solenoid. Accordingly, the main controller 260 may modulate fluid communication between the actuator cylinders 280 and the pump 272, atmosphere, or the fluid tank 276 relative to a respective fluid communication for each fully implemented valve position. According to an aspect of the present disclosure, the main controller 260 may ramp the valve current $I_V$ to be equal to the maximum float current $I_{F-max}$ or the minimum float current $I_{F-min}$, to operate the valve 274 to respectively be fully or partially positioned in the fourth valve position. Thus, valve current $I_V$ supplied to the solenoid of the valve 274 may affect the speed at which body 120 moves in block S906 or block S908 when the body floats down to the first body position A.

In block S910 the main controller 260 determines and compares the body lowering speed $s_L$ to the target float speed $s_F$. While the valve current $I_V$ is being ramped according to block S906 or block S908, the body 120 may be moving faster or slower than the target float speed $s_F$ due to a load in the body 120 or previous operation of hoist system 270 (the instant valve current $I_V$ being dependent on an operation of the positioning mode actuator 256). As a result, a current needed to operate the valve 274 so the body 120 moves (floats) at the target float speed $s_F$ may be different from the maximum float current $I_{F-max}$ or the minimum float current $I_{F\text{-}min}$. The main controller 260 determines the body lowering speed $s_L$ is not equal to (or within a prescribed range of) the target float speed $s_F$ in block S910, and in block S912, determines an adjustment current $I_A$ based on a difference between the body lowering speed $s_L$ and the target float speed $s_F$. The adjustment current $I_A$ corresponds to a differential (+/− current gain) between the valve current $I_V$ at a time when the body lowering speed $s_L$ is compared to the target float speed $s_F$, and the current required to move the valve 274 into a position to control the body 120 to move at the target float speed $s_F$.

An operator may operate the positioning mode actuator 256 without actively selecting the float operation resulting in the body 120 moving very fast. For example, the operator moves the lever 400 towards the first end position $\theta_{Pmax1}$ without engaging the first detent 406 and holds the lever 400 in a position adjacent to the first detent 406. The valve 274 may fully be in the second valve position with the body 120 being powered down when the hoist system 270 transitions to the float operation in block S906 or S908. This may also occur if the body 120 was being lowered according to the first or second auto lower modes. Accordingly, the valve current $I_V$ may need to be significantly reduced to move the valve 274 into a position resulting in the body lowering speed $s_1$, equaling the target float speed $s_F$. In block S914, the main controller determines a sum of the valve current $I_V$ and the adjustment current $I_A$ is less than the minimum float current $I_{F\text{-}min}$, and ramps the valve current $I_V$ to operate the valve 274 according to the minimum float current $I_{F\text{-}min}$ in block S916.

The operation of the valve 274 resulting from block S916 may provide a minimum fluid communication between the actuator cylinders 280 and the fluid tank 276 or atmosphere that allows the body 120 to be passively lowered, and thereby reduce the body lowering speed In the case of a manual operation of the hoist system 270, the body lowering speed $s_L$ will be reduced while an operator maintains the lever 400 in the same position which resulted in the body 120 moving rapidly prior to reaching the float position $\theta_{B\text{-}Float}$. The operator does not have to repeatedly operate the positioning mode actuator 256 to cycle between hold and float operations in order to slow down (start and stop) the body 120 when it is floating to lessen a forceful impact on the frame 110 when the body 120 reaches the first body position A. Rather, an operator can safely lower/float the body 120 to the first body position A and minimize the force applied to the frame 110 with a single unchanging operation of the lever 400 of the positioning mode actuator 256.

Where the main controller 260 determines the sum of the valve current $I_V$ and adjustment current $I_A$ is greater than the minimum float current $I_{F\text{-}min}$, in block S918, the main controller 260 determines if the sum is greater than the maximum float current $I_{F\text{-}max}$, and if the valve current $I_V$ is ramping according to the maximum float current $I_{F\text{-}max}$. If both conditions in block S918 are satisfied, the main controller determines an estimated current $I_E$ based on the lever position $\theta_P$ in block S920. In addition, in block S920, the main controller 260 operates the valve 274 (ramps the valve current $I_V$) according to the lesser of the estimated current $I_E$ and the maximum float current $I_{F\text{-}max}$. If either condition in block S918 is not satisfied, the estimated current $I_F$ determined and the valve 274 is operated according to the lesser of the estimated current $I_E$ and the sum of the valve current $I_V$ and adjustment current $I_A$ in block S922.

The operation of the hoist system 270 in block S918, block S920, and block S922 may correspond to a situation in which the body lowering speed $s_L$ is less than the target float speed $s_F$ during a manual operation of the hoist system 270. For example, the body lowering speed $s_L$ may be appreciably less than the target float speed $s_F$ when hoist system 270 transitions to the float operation in block S906 or S908, where an operator holds the lever 400 adjacent to the center detent 404 without previously engaging the first detent 406. While the operator holds the lever 400 in the same position, the main controller 260 operates the hoist system 270 by ramping the valve current $I_V$ according to the maximum float current $I_{F\text{-}max}$, the adjustment current $I_A$, or estimated current $I_E$ to operate the valve 274. The main controller 260 operates the hoist system 270 to increase the body lowering speed $s_L$ (speed of the passive movement of the body 120) during the float operation in a controlled manner without the operator moving the lever 400.

The position sensor 288 is accessed in block S924 and the main controller 260 determines if the body 120 is positioned in the first body position A subsequent to the main controller 260 (1) determining the body lowering speed $s_L$ is equal to the target float speed $s_F$ in block S910, or (2) operating the valve 274 according to block S916, block S920, or block S922. If it is determined the body 120 is not in the first body position A, the main controller 260 again compares the body lowering speed $s_L$ to the target float speed $s_F$ in block S910. Where it is determined the body 120 is in the first body position A, the main controller 260 completes the body lower speed control implementation algorithm 900. For the method of controlling a hoist system mode of operation 600, the body 120 may be considered to be at a third position.

Regardless of the activation state of the multi-auto mode, the main controller 260 implements the selected auto lower mode implementation algorithm 700 and the body lower speed control implementation algorithm 900 when the conditions in block S618 and block S620 are satisfied. In the body lower speed control implementation algorithm 900, the main controller 260 operates the hoist system 270 to complete the float operation and passively lower the body 120. As such, an operator may be considered to have actively selected the float operation by sequentially moving the lever 400 in the first operating direction 412 from the center detent 404 past the first detent 406 (first detent front engagement), and either releasing or actively moving the lever 400 in the second operating direction 414 past the first detent 406 but short of passing the center detent 404 (first detent return engagement). Therefore, the float operation may be selected/ carried out without moving the lever 400 into a separate position exclusive to a selection of the float operation. Accordingly, the control system 250 can be incorporated into other machines including different types of material dispersal devices that may not have the float operation or an operation analogous to the float operation, and the positioning mode actuator 256 may be operative to control the different types of the material dispersal devices to fully perform their respective functions.

While the machine 100 illustrated in FIG. 1 may include an ejector (not shown), the body 120 and the hoist system 270 of the machine 100 respectively define a material dispersal device and dispersal device actuator of the machine 100 operated in response to operations of the positioning mode actuator 256. However, the control system 250 of the machine 100 can be dynamically configured to change a device controlled by the actuator system 251 in response to an operator input designating the ejector 1040 as a material dispersal device to be operated by the positioning mode actuator 256. In addition, the control system 250 may be self-configurable upon installation in the machine 100 of FIG. 1, or the machine 1000 illustrated in FIG. 10, which exclusively employs an ejector 1040 as a material dispersal device.

Figure 10:
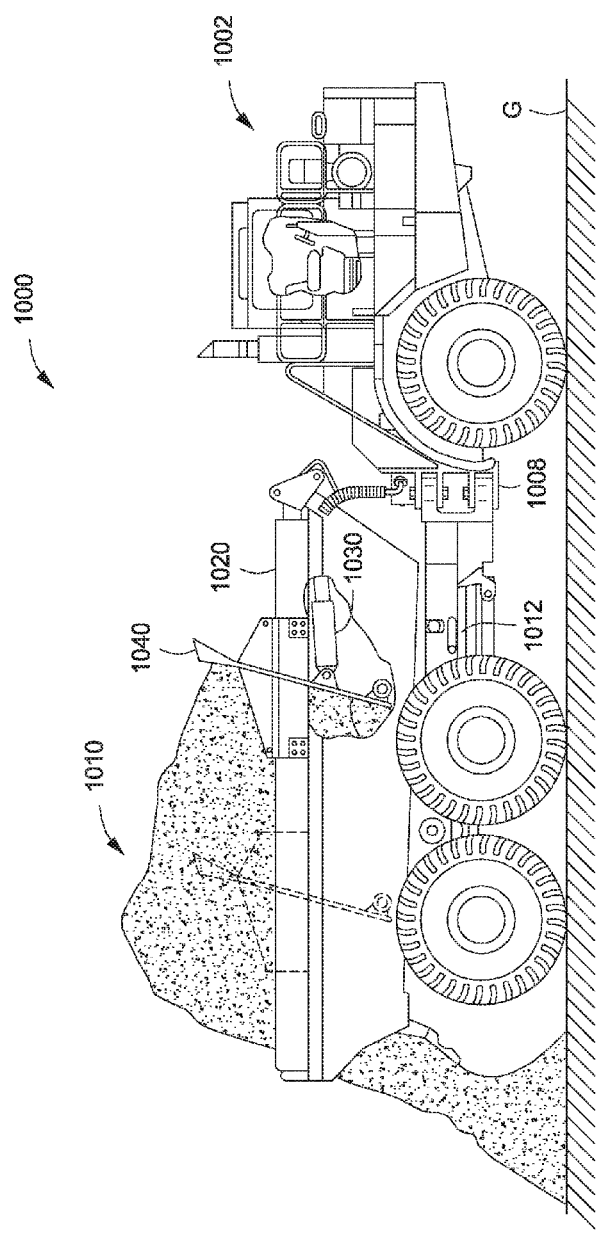
FIG. 10 illustrates a side view of a machine, according to an aspect of the present disclosure.

FIG. 10 illustrates a side view of the machine 1000 which may include a first frame 1002 attached by a coupling 1008 to a chassis 1012 to a second frame 1010. The first frame 1002 may include a cab 1004 that houses a plurality of controls including the control system 250 illustrated with FIGS. 2 and 3. The second frame 1010 may comprise a body 1020 attached to the chassis 1012 in a fixed position. A hydraulic actuator 1030 is attached to the body 1020, and ejects or retracts the ejector 1040 within the body 1020 to provide a dispersal device actuator. In an ejecting operation, the ejector 1040 will move to a rear of the machine 1000 and eject material from within the body 1020. In a retract operation, the ejector 1040 is returned to a front of the body 1020. A position sensor (not shown) in communication with the main controller 260 may detect a position of the ejector 1040 along a longitudinal axis of the body 1020.

Figure 11:
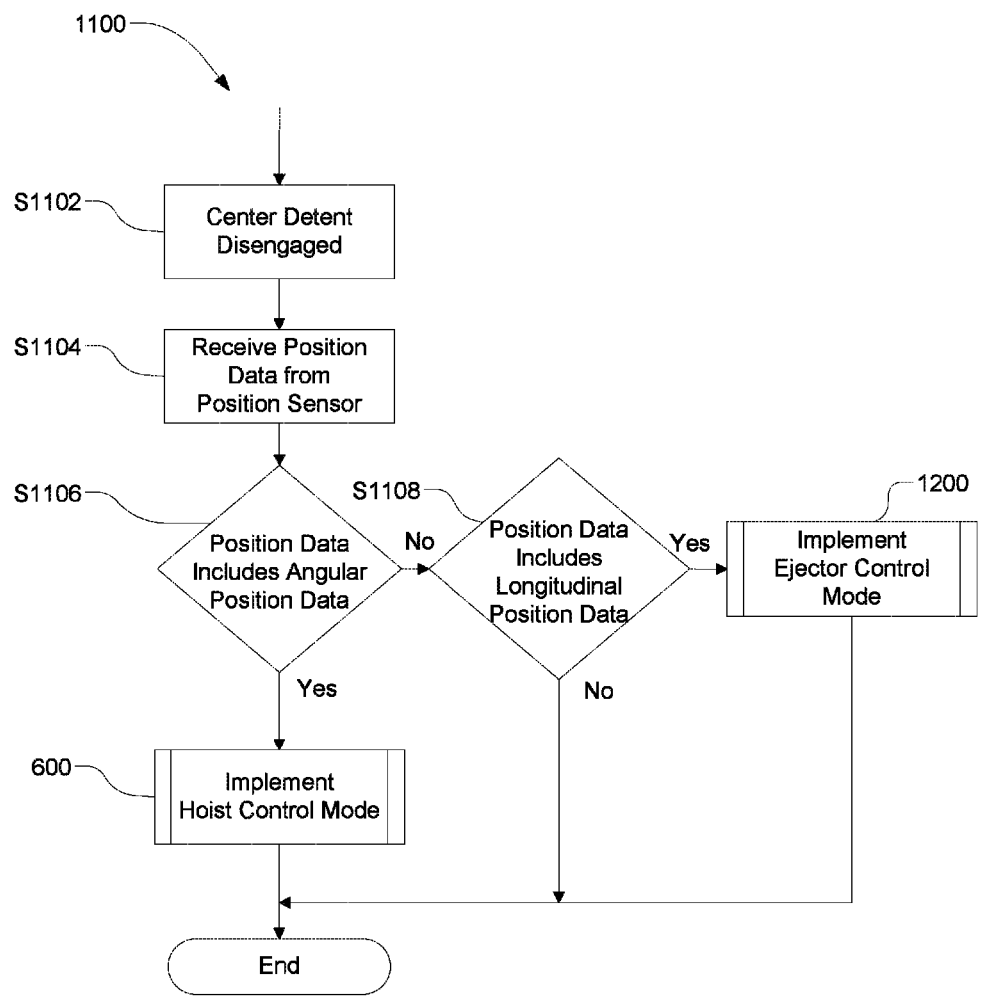
FIG. 11 is an algorithmic flowchart illustrating a method of configuring a control mode of a control system, according to one aspect of the present disclosure.

FIG. 11 is an algorithmic flowchart illustrating a method of configuring a control mode 1100 of the control system 250 according to a type of material dispersal device (e.g. the body 120 of the machine 100, or the ejector 1040 of machine 1000), according to an aspect of the present disclosure. In block S1102, main controller 260 receives a signal that the positioning mode actuator 256 is disengaged from the center detent 404. In block S1104, position data is received from sensors that track motion of a material dispersal device of a respective machine in which the control system 250 is installed. In block S1106, the main controller 260 evaluates the type of position data acquired. In the case of the machine 100 illustrated in FIG. 1, the main controller 260 may register angular position related data from the position sensor 288 and implement an algorithm corresponding to the method of controlling a hoist system mode of operation 600 illustrated in FIG. 6.

In the case where the control system 250 is installed in a machine that does not include a hoist system or include sensors that detect and communicate angular position data, the main controller 260 evaluates the position data obtained in block S1104 for longitudinal position data in block S1108; such as the position data that would be generated by the sensor (not shown) of the machine 1000 illustrated in FIG. 10. Where longitudinal position data is received, the method of configuring a control mode 1000 ends. However, in the case of the machine 1000 for example, the main controller 260 would register longitudinal position data for the ejector 1040 and execute an ejector control mode implementation algorithm 1200. One of ordinary skill in the art will recognize that the main controller 260 may determine a type of material dispersal device by accessing other information such as a machine's central control/information system which includes part information indicating the type of material dispersal device of the machine.

Figure 12:
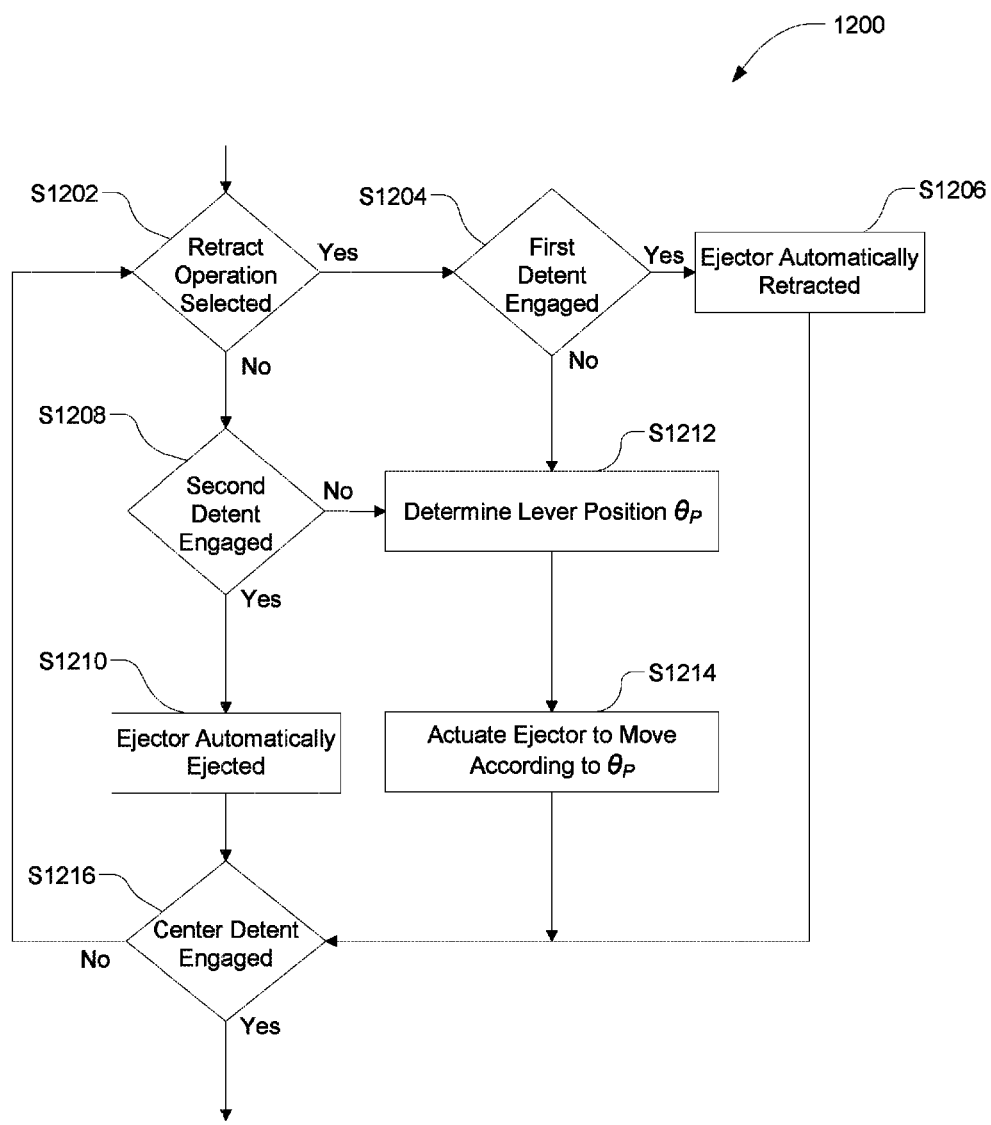
FIG. 12 is an algorithmic flowchart illustrating a method of controlling an ejector mode of operation, according to an aspect of the present disclosure.

An example of the ejector control mode implementation algorithm 1200 is provided by an algorithmic flowchart of FIG. 12, which illustrates a method of controlling an ejector 1040, according to an aspect of the present disclosure. In block S1202, the main controller 260 accesses the positioning mode actuator 256 to determine the lever position $\theta_P$ to determine whether an eject or retract operation has been selected. Where the retract operation is selected, the main controller 260 determines whether the first detent 406 has been engaged by the lever 400 in block S1204. The main controller 260 determines the lever 400 has moved at least through the first intermediate position $\theta_{P1}$ and operates, for example via an ECM, the hydraulic actuator 1030 to move the ejector 1040 automatically to the front of the body 1020 in block S1206. Where the eject operation is selected, the main controller 260 determines whether the second detent 408 has been engaged by the lever 400 in block S1208. The main controller 260 determines the lever 400 has moved at least through the second intermediate position $\theta_{P2}$ and operates the hydraulic actuator 1030 to eject the ejector 1040 automatically to a rear of the body 1020 in block S1210.

If the condition of block S1204 or block S1208 is not satisfied, the main controller 260 determines the lever position $\theta_P$ in block S1212. In block S1214, the main controller 260 actuates, via an ECM for example, the hydraulic actuator 1030 to move the ejector 1040 according to a mapping of the manual modulation range of the positioning mode actuator 256 to an operation of the ejector 1040.

Following the operation of the ejector 1040 in block S1206, S1210, or block S1214, the main controller 260 may determines the center detent 404 has been engaged in block 51216 and end the ejector control mode implementation algorithm 1200. Where the center detent 404 has not been engaged the main controller 260 determines whether the eject or retract operation has been selected in block S1202.

Figure 13:
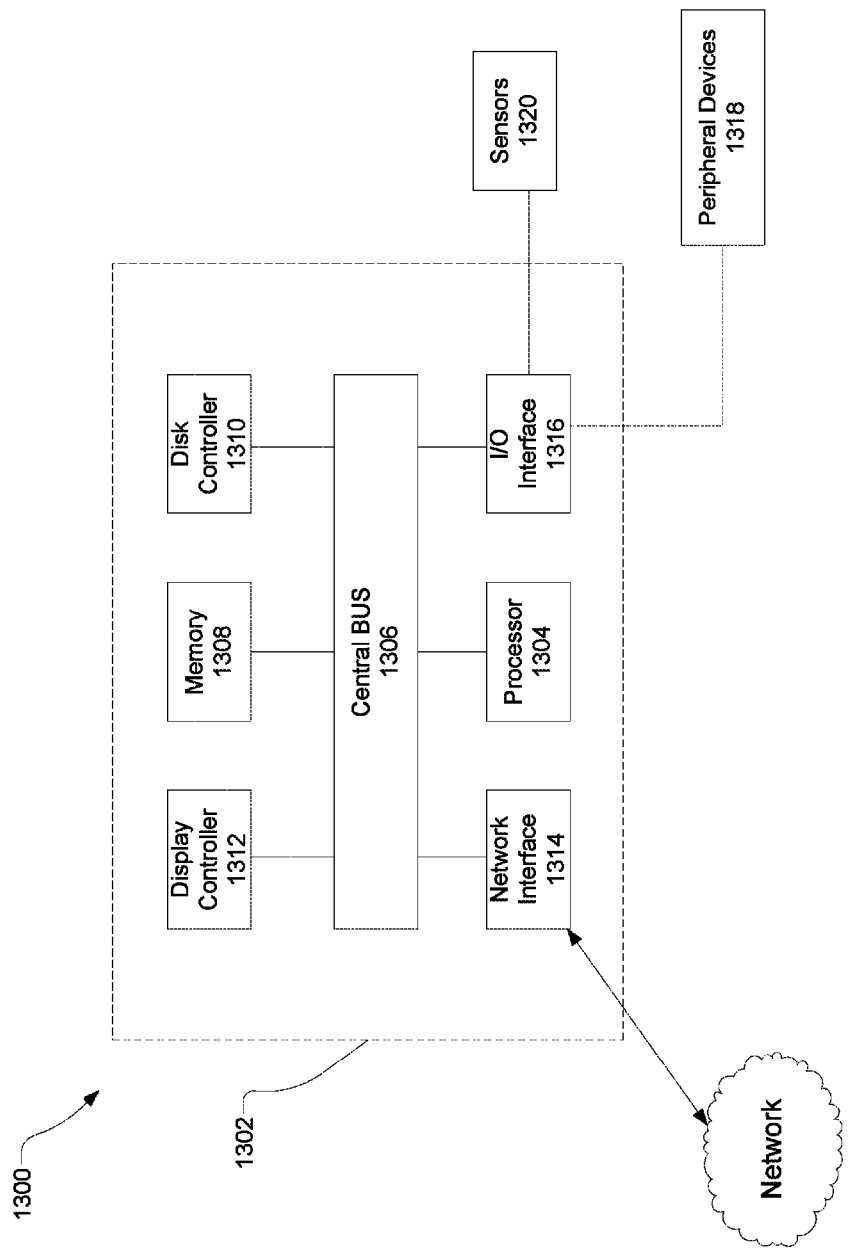
FIG. 13 illustrates a general-purpose computer system, according to an aspect of the present disclosure.

FIG. 13 illustrates a general-purpose computer system 1300, according to an aspect of the present disclosure. The general-purpose computer system 1300 includes or is configured to access one or more computer-accessible media, and includes a computing device 1302 with exemplary hardware incorporated therein. According to an aspect of the present disclosure, the control system 250, main controller 260, or the brake controller 232 may include or be defined by the computing device 1302, and the exemplary hardware illustrated in FIG. 13 may implement and/or execute the processes, algorithms and/or methods described in the present disclosure.

The computing device 1302 may include a processor 1304 with one or more processors (which may be referred to singularly as the processor 1304 or in the plural as the processors 1304) coupled via a central BUS 1306 or other I/O interface, to a memory 1308. The computing device 1302 may further include a disk controller 1310, a display controller 1312, a network interface 1314, and an I/O interface 1316 coupled to the central BUS 1306.

In various aspects, the processor 1304 of the computing device 1302 may be a uniprocessor system including one processor, or a multiprocessor system including several processors (e.g., two, four, eight, or another suitable number). The processors 1304 may be any suitable processors, including application specific processors (ASP), capable of executing instructions. As another example, in various aspects, the processor(s) may be general-purpose or embedded processors implementing any of a variety of instruction set architectures (ISAs), such as the x86, PowerPC, SPARC, or MIPS ISAs, or other suitable ISA. In multiprocessor systems, each of the processors 1304 may commonly, but not necessarily, implement the same ISA.

According to an aspect of the present disclosure, the processor 1204 may include a logic device for augmenting or fully implementing the methods and algorithms of the present disclosure. Such a logic device may include, but is not limited to, an application-specific integrated circuit (ASIC), a field programmable array (FPGA), a generic-array of logic (GAL), and their equivalents. Further, general-purpose computer system 1300 may benefit from parallel processing capabilities of a multi-cored central processing unit (CPU).

The system memory 1208 may be configured to store instructions and data accessible by the processor(s) 1204. In various aspects, the memory 1208 may be implemented using any suitable memory technology, such as static random access memory ("SRAM"), synchronous dynamic RAM ("SDRAM"), nonvolatile/Flash®-type memory, or any other type of memory (e.g., ROM, EPROM, EEPROM, DRAM, and their equivalents). Program instructions and data implementing one or more desired functions, such as those methods, techniques and data described above, may be stored within the memory 1308 as code and data.

In some aspects, the memory 1308 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD controller coupled to the computing device 1302 via the central BUS 1306, in particular via the disk controller 1310. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 1302 as the memory 1308 or another type of memory.

Further, a computer-accessible medium may include transmission media or signals, such as electrical, electromagnetic or digital signals, conveyed via a communication medium, such as a network and/or a wireless link, such as those that may be implemented via the network interface 1314. Portions or all of multiple computing devices, such as those illustrated in FIG. 13, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device" used herein, refers to at least all, but is not limited to, these types of devices.

The network interface 1314 may be configured to allow data to be exchanged between the computing device 1302 and other device or devices attached to a network(s), such as other computer systems or devices, for example. In various aspects, the network interface 1314 may support communication via any suitable wired or wireless general data networks, such as types of Ethernet networks, for example. Additionally, the network interface 1314 may support communication via telecommunications/telephony networks, such as analog voice networks or digital fiber communications networks, via storage area networks, such as Fibre Channel SANs (storage area networks), or via any other suitable type of network and/or protocol.

In one aspect, the central BUS 1306 may be configured to coordinate I/O traffic between the processor(s) 1304, the memory 1308, the network interface 1314, and any peripherals 1318 which may include, for example, the actuators of the actuator system 251, the throttle 238, and the manual brake actuator 236 which may transmit data and receive instructions from the I/O interface 1316. Additionally, the I/O interface 1316 is provided for inputting signals and/or data from sensors 1330, which may include the sensor that monitors the motion of the machine 100, the sensor that detects the roll angle, a sensor that detects a speed of the machine 100, the position sensor 288, the weight sensor 290, and the angular velocity sensor In some aspects, the central BUS 1306 may perform any necessary protocol, timing or other data transformations to convert data signals from one component (e.g., the memory 1308) into a format suitable for use by another component (e.g., the processor 1304). In some aspects, the central BUS 1306 may include support for devices attached through various types of peripheral buses, such as a variant of the Peripheral Component Interconnect (PCI) bus standard or the Universal Serial Bus (USB) standard, for example. In some aspects, the function of the central BUS 1306 may be split into two or more separate components, such as a north bridge and a south bridge, for example. Also, in some aspects some or all of the functionality of the central BUS 1306, such as an interface to the memory 1308, may be incorporated directly into the It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any in any type of non-transitory computer storage such as, e.g., volatile or non-volatile storage.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A method for implementing an operation of a body of a machine, the method comprising:
   receiving, using one or more processors, data indicating an operation of a positioning mode actuator to facilitate movement of the body from a first position;
   determining, using the one or more processors, an activation state of a multi-auto mode to actuate a first auto lower mode to operate a hoist system to lower the body automatically and a first auto raise mode to operate the hoist system to raise the body automatically, in response to receiving the data indicating the operation of the positioning mode actuator;
   determining, using the one or more processors, the first auto lower mode is selected according to the data indicating the operation of the positioning mode actuator; and causing a hoist system to actively lower the body from the first position to a second position and passively lower the body from the second position to a third position, in response to determining the first auto lower mode is selected, independent of the activation state of the multi-auto mode.

2. The method of claim 1,
wherein the positioning mode actuator includes a lever pivotally mounted to an actuator base, the actuator base including a center detent positioned between a first detent and a second detent,
wherein the lever is biased to engage the center detent in a normal state, and
wherein movement of the lever in a first direction towards the first detent from the center detent corresponds to a lowering motion of the body and movement of the lever in a second direction from the center detent towards the second detent corresponds to a raising motion of the body.

3. The method of claim 2,
wherein determining the first auto lower mode is selected includes determining the lever engaged the first detent according to a first detent front engagement and a first detent return engagement,
wherein the first detent front engagement includes the lever moving in the first direction past the first detent, and
wherein the first detent return engagement includes the lever moving in the second direction past the first detent to a position at least between the first detent and the center detent.

4. The method of claim 3, further comprising:
determining, using the one or more processors, an activation state of a multi-system mode to actuate a second auto lower mode and a second auto raise mode to operate the hoist system to move the body automatically and operate at least one of an engine, a transmission, and a brake system of the machine,
determining, using one or more processors, the operation of the positioning mode actuator includes the first detent front engagement and the first detent return engagement, and
causing, in response to determining the second auto lower mode is selected, the activation state of the multi-auto mode is active, and the activation state of the multi-system mode is active:
the hoist system to actively lower the body from the first position to the second position and passively lower the body from the second position to the third position, and
an automatic operation of at least one of the engine, the transmission, and the brake system.

5. The method of claim 2, further comprising:
determining, using the one or more processors, the operation of the positioning mode actuator includes the lever being continuously disengaged from the center detent in the first direction;
determining, using the one or more processors, the operation of the positioning mode actuator does not include the first detent front engagement; and
causing the hoist system to passively lower the body from the second position to a third position.

6. The method of claim 5, further comprising:
determining, using the one or more processors, a body lowering speed of the body moving from the first position to the second position; and
causing the hoist system to reduce body lower speed as the hoist system passively moves the body from the second position to the third position based on the body lower speed.

7. The method of claim 5,
wherein the hoist system includes a valve for modulating an output of the hoist system transmitted to the body, and
wherein causing the hoist system to reduce the body lowering speed includes:
determining, using the one or more processors, a valve position for the valve corresponding to a target float speed for moving the body from the second position to the third position, and
operating the valve to be positioned in the valve position as the hoist system passively moves the body towards the third position.

8. The method of claim 7, wherein determining the valve position includes determining a valve current operating the valve and an adjustment current according to a difference between target float speed and the body lowering speed.

9. The method of claim 8,
wherein determining the valve position includes operating the valve according to a minimum float current in response to determining a sum of the valve current and the adjustment current is less than the minimum float current,
wherein the minimum float current corresponds to a position of the valve facilitating minimum fluid communication between a hoist device of the hoist system and a source of low pressure enabling the hoist system to passively lower the body.

10. The method of claim 2, further comprising:
detecting, using one or more sensors, a weight of the body and a body lower speed the body is moving from the first position;
determining, using the one or more processors, a location of the second position according to the weight of the body and the body lower speed; and
causing the hoist system to passively lower the body from the second position to the third position, in response to:
determining, using the one or more processors, the lever remains disengaged from the center detent in the direction of the first detent, and
detecting, using the one or more sensors, the body is located in the second position.

11. The method of claim 2, further comprising:
determining, using one or more processors, the operation of the positioning mode actuator includes the lever disengaging the center detent in the first direction and reengaging the center detent without engaging the first detent, and
causing the hoist system to hold the body in a current position in response to the lever reengaging the center detent.

12. A method for implementing an operation of a body of a machine, the method comprising:
receiving, using one or more processors, first data indicating a lever pivotally mounted on an actuator base of a positioning mode actuator is disengaged from a center detent within the actuator base;
determining, using the one or more processors, an operating direction of the lever relative to the center detent according to the first data and a moving direction for moving the body according to the operating direction of the lever;

causing a hoist system to actively move the body in the moving direction;

detecting, using one or more sensors, a position of the body as the body moves in the moving direction; and causing the hoist system to stop actively moving the body in the moving direction at a second position and passively move the body in the moving direction from the second position to a third position, in response to determining that:

the moving direction corresponds to a lowering motion of the body, the lever remains disengaged from the center detent and the operating direction of the lever continues to correspond to the lowering motion, and the body is located at the second position.

13. The method of claim 12, further comprising:

determining, using the one or more sensors, a body lowering speed of the body during the lowering motion; and causing the hoist system to actively move the body towards the second position and reduce the body lowering speed from the second position to the third position, in response to determining the lever remains disengaged from the center detent and the operating direction of the lever continues to correspond to the lowering motion.

14. The method of claim 13, wherein the hoist system includes a valve for modulating an output of the hoist system transmitted to the body, wherein causing the hoist system to continuously reduce the speed the hoist system moves the body from the first position includes:

wherein causing the hoist system to reduce the body lowering speed includes:

determining, using the one or more processors, a valve position for the valve corresponding to a target float speed for moving the body from the second position to the third position, and operating the valve to be positioned in the valve position as the hoist system passively moves the body towards the third position.

15. The method of claim 12, wherein the lever is configured to move from the center detent towards a first detent of the actuator base in a first operating direction corresponding to the lowering motion of the body, wherein the lever is configured to move from the center detent towards a second detent of the actuator base in a second operating direction corresponding to a raising motion of the body, and wherein the lever is biased to engage the center detent in a normal state.

16. A method of claim 15, further comprising:

receiving, using the one or more processors, second data indicating the lever engaged the first detent moving in the first operating direction and the second operating direction; and causing an automatic operation of the hoist system for lowering the body in response to receiving the second data, wherein the automatic operation includes the hoist system actively lowering the body from the first position to the second position and passively lowering the body from the second position to the third position.

17. A method of claim 15, further comprising:

determining, using the one or more processors, an activation state of a multi-system mode, in response to receiving the first data;

receiving, using the one or more processors, second data indicating the lever has engaged the second detent at least once; and causing an automatic operation of the hoist system to actively raise the body from the first position to a fourth position and an automatic operation of one of an engine, a transmission, and a brake system of the machine, in response to determining:

the activation state of multi-system mode is active, and the second data indicates the lever sequentially disengaged the center detent, engaged the second detent, and reengaged the second detent.

18. The method of claim 17, further comprising:

causing the hoist system to hold the body in a position of the body at a time the lever reengages the center detent, in response to determining:

the second data indicates the lever sequentially disengaged the center detent, engaged the second detent, and reengaged the center detent, and the activation state of multi-system mode is inactive.

19. A machine comprising:

a frame;

a cab mounted on the frame and configured to accommodate a user;

an engine mounted on the frame;

a body attached to the frame configured to hold material;

a material dispersal device configured to move relative to the frame to move the material from the body;

a positioning mode actuator in the cab configured to actuate a dispersal device actuator to move the material dispersal device;

a sensor configured to detect a position of the material dispersal device; and a controller operatively connected to the positioning mode actuator, the dispersal device actuator, the sensor, and the engine, wherein the material dispersal device is one of the body and an ejector positioned in the body, and wherein the controller is configured to access the sensor and determine the material dispersal device is the one of the body and the ejector according to position data obtained from the sensor, and wherein the controller is configured to set a control mode for operating the material dispersal device actuator according the material dispersal device being the one of the body and the ejector.

20. The machine of claim 19, wherein the positioning mode actuator includes a lever pivotally mounted on an actuator base that includes a center detent positioned between a first detent and a second detent, wherein the positioning mode actuator, in a control mode for operating the dispersal device actuator to move the body, is configured to actuate an automatic operation of dispersal device actuator to actively lower the body from a first position to a second position and passively lower the body from the second position to a third position according to an operation of the lever sequentially disengaging the center detent, engaging the first detent, and reengaging the first detent, and wherein the positioning mode actuator, in a control mode for operating the dispersal actuator to move the ejector within the body, is configured to actuate an automatic operation of dispersal device actuator to move the ejector automatically to a front of the body according to the operation of the lever sequentially disengaging center detent, engaging the first detent, and reengaging the center detent.

* * * * *